(12) United States Patent
Sugiyama

(10) Patent No.: US 7,944,775 B2
(45) Date of Patent: May 17, 2011

(54) ADAPTIVE ARRAY CONTROL DEVICE, METHOD AND PROGRAM, AND ADAPTIVE ARRAY PROCESSING DEVICE, METHOD AND PROGRAM

(75) Inventor: Akihiko Sugiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 394 days.

(21) Appl. No.: 12/297,853

(22) PCT Filed: Apr. 12, 2007

(86) PCT No.: PCT/JP2007/058098
§ 371 (c)(1),
(2), (4) Date: Oct. 20, 2008

(87) PCT Pub. No.: WO2007/123052
PCT Pub. Date: Nov. 1, 2007

(65) Prior Publication Data
US 2009/0073040 A1    Mar. 19, 2009

(30) Foreign Application Priority Data
Apr. 20, 2006    (JP) ................................ 2006-117289

(51) Int. Cl.
H04B 1/06    (2006.01)
(52) U.S. Cl. ...................................................... 367/135
(58) Field of Classification Search .................. 367/124, 367/135
See application file for complete search history.

(56) References Cited

U.S. PATENT DOCUMENTS

| | | | |
|---|---|---|---|
| 2009/0073040 A1* | 3/2009 | Sugiyama | 342/378 |
| 2009/0086578 A1* | 4/2009 | Sugiyama | 367/138 |
| 2010/0171662 A1* | 7/2010 | Sugiyama | 342/378 |

OTHER PUBLICATIONS

L. Griffiths et al. "An Alternative Approach to Linearly Constrained Adaptive Beamforming" IEEE Transactions on Antennas and Propagation, Jan. 1982, pp. 27-34, vol. AP-30 No. 1, IEEE.
I. Claesson et al. "A Spatial Filtering Approach to Robust Adaptive Beaming" IEEE Transactions on Antennas and Propagation, Sep. 1992, pp. 1093-1096, vol. 40 No. 9, IEEE.
O. Hoshuyama et al. "A Robust Generalized Sidelobe Canceller with Blocking Matrix Using Leaky Adaptive Filters" The Transactions of the Institute of Electronics, Information and Communication Engineers A, Sep. 1996, pp. 1516-1524, vol. 79 No. 9.
O. L. Frost "An Algorithm for Linearly Constrained Adaptive Array Processing" Proceedings of the IEEE, Aug. 1972, pp. 926-935, vol. 60 No. 8.

(Continued)

*Primary Examiner* — Dan Pihulic
(74) *Attorney, Agent, or Firm* — Sughrue Mion, PLLC

(57) ABSTRACT

[Object] By enabling accurate coefficient update, a high-quality array processing output which is less influenced by frequency characteristics and incoming directions of input signals control can be acquired, irrespective of the frequency characteristics and incoming direction of the input signals. [Achieving Means] Identification information of a target signal and interference by amplitude is corrected according to identification information of the target signal and the interference by phase, and with use of the correction result, identification of the target signal and the interference is performed. More specifically, an identification information generation section according to phase, a correction signal generation section, and a correction section are provided.

44 Claims, 32 Drawing Sheets

OTHER PUBLICATIONS

S. Affes et al. "Robust Adaptive Beamforming via LMS-Like Target Tracking" IEEE Proceedings of International Conference on Acoustics, Speech, and Signal Processing, Apr. 1994, pp. 269-272, vol. IV, IEEE.

S. Haykin "Radar Array Processing for Angle of Arrival Estimation" Array Signal Processing, 1993, pp. 194-292, Prentice Hall, Englewood Cliffs.

O. Hoshuyama et al. "Robust Adaptive Beamforming" Microphone Arrays: Signal Processing Techniques and Applications, 2001, pp. 87-109, Springer, Berlin.

J. Greenberg et al. "Evaluation of an Adaptive Beamforming Method for Hearing Aids" Journal of Acoustical Society of America, Mar. 1992, pp. 1662-1676, vol. 91 No. 3.

O. Hoshuyama et al. "A Realtime Robust Adaptive Microphone Array Controlled by an SNR Estimate" IEEE Proceedings of ICASSP, Apr. 1998, pp. 3605-3608.

O. Hoshuyama et al. "An Adaptive Microphone Array with Good Sound Quality Using Auxiliary Fixed Beamformers and its DSP Implementation" IEEE Proceedings of ICASSP, Mar. 1999, pp. 949-952.

P.P. Vaidyanathan "Multirate Systems and Filter Banks" 1993, pp. 188-271, Prentice Hall, Englewood Cliffs.

D. Ward et al. "Constant Directivity Beamforming" Microphone Arrays: Signal Processing Techniques and Applications, 2001, pp. 3-5, Springer, Berlin.

* cited by examiner

ADAPTIVE ARRAY CONTROL DEVICE, METHOD AND PROGRAM, AND ADAPTIVE ARRAY PROCESSING DEVICE, METHOD AND PROGRAM

This applications is based upon and claims the benefit of priority from Japanese patent applications No. 2006-117289, filed on Apr. 20, 2006, the disclosure of which is incorporated herein in its entirety by reference.

TECHNICAL FIELD

The present invention relates to an adaptive array control device, a method and their program, and an adaptive array processing device, a method, and their program. In particular, the present invention relates to an adaptive array control device, method and program for receiving signals with directivity using a plurality of sensors, and an adaptive array processing device, method, and its program.

In the field of audio signal acquisition, sonars, and wireless communications, a speech enhancement device by means of an adaptive microphone array and a wireless transceiver by means of an adaptive antenna array have been known, for example. Such a device is capable of enhancing and receiving only a particular signal from a plurality of signal sources, which is an application of an adaptive array technique. As sensors, microphones, ultrasonic sensors, sonar receivers, and radio wave antennas may be used.

Here, a case of using microphones as sensors will be described.

Hereinafter, in order to simplify the description, a case where microphones are arranged on a line at equal interval will be considered. Further, it assumes that a target audio source is sufficiently distant from the line on which the microphones are arranged, and that the direction of the target audio source is orthogonal to the line.

A microphone array filters signals input to a plurality of microphones, and then adds them to form a spatial filter. With this spatial filter, only a signal incoming from a predefined direction, or a switch target signal, is enhanced, and signals other than the target signal are attenuated. An adaptive microphone array is an array of microphones having a function of adaptively varying the spatial filter characteristics. As a configuration of an adaptive microphone array, a "generalized sidelobe canceller" disclosed in Non-Patent Document 1, the configuration disclosed in Non-Patent Document 2, the configuration disclosed in Non-Patent Document 3, the "frost beamformer" disclosed in Non-Patent Document 4, and the configuration disclosed in Non-Patent Document 5, have been known, for example.

A generalized sidelobe canceller, which is a basic adaptive array processing device disclosed in Non-Patent Document 1, includes a fixed beamformer, a blocking matrix circuit, and a multi-input canceller. The blocking matrix circuit includes an adaptive blocking matrix circuit including adaptive filters. The fixed beamformer processes a plurality of sensor signals and enhances a target signal. The blocking matrix circuit suppresses the target signal included in the plurality of sensor signals, and relatively enhances interferences.

The adaptive blocking matrix circuit subtracts a pseudo target signal generated by the adaptive filters from the plurality of the sensor signals with the fixed beamformer output being used as a reference signal, and supplies to a multi-input canceller. The adaptive filter coefficient of the adaptive blocking matrix circuit is to be updated so as to minimize an output of the adaptive blocking matrix circuit with use of the fixed beamformer output and an output of the adaptive blocking matrix circuit.

The multi-input canceller subtracts a pseudo interference generated by the adaptive filters from the fixed beamformer output with an output of the blocking matrix circuit being used as a reference signal. In the signal obtained by the subtraction processing, the target signal is enhanced and the interference is suppressed, which becomes an array display output. Through the subtraction processing, correlation of the output signal with respect to the interference is eliminated. The adaptive filter coefficient of the multi-input canceller is updated to minimize the multi-input canceller output using the blocking matrix circuit output and the multi-input canceller output.

As the fixed beamformer, a delay-and-sum beamformer which delays respective sensor signals and adds them, a filter-and-sum beamformer which filters and adds them, may be used. Those fixed beamformers are described in Non-Patent Document 6 in detail.

The delay-and-sum beamformer delays a plurality of sensor signals for only the unique number of samples of each signal, and after multiplying a unique coefficient by each signal, calculates the sum and outputs it. The delay time of each signal is set such that after each sensor signal is delayed, the phases of the target signal included therein will become the same. Consequently, the target signal included in the output of the delay-and-sum beamformer is enhanced.

On the other hand, for the interference incoming from a direction different from that of the target signal, as the phases are different from each other in the respective delayed signals, the interferences are offset each other by addition and attenuated. As such, in the output of the delay-and-sum beamformer, the target signal is enhanced and the interferences are attenuated. The filter-and-sum beamformer has a configuration such that delaying and constant multiplying with respect to sensor signals in the delay-and-sum beamformer are replaced with filters. Those filters can be made such that effects of delaying and constant multiplying in the delay-and-sum beamformer differ with respect to respective frequencies. As such, the target signal enhancing effect is more enhanced compared to that of the delay-and-sum beamformer with respect to signals in which spectrum is not flat.

The adaptive blocking matrix circuit and the multi-input canceller include a plurality of adaptive filters. As such adaptive filters, structures of FIR filters, IIR filters, and lattice filters may be used. Further, as a coefficient update algorithm of those adaptive filters, NLMS algorithm (learning identification method or normalized LMS algorithm), RLS algorithm (sequential minimum square method), a projection algorithm, a gradient method, an LS algorithm (minimum square method), a block adaptive algorithm, and adaptive algorithm of transform region may be used. Further, when performing coefficient updating, a tap coefficient constraint adaptive algorithm applying constraint to a coefficient value to be newly calculated, a leak adaptive algorithm, and a tap norm constraint adaptive algorithm applying constraint to a coefficient value norm may be used. As those coefficient update algorithms with constraint are described in Non-Patent Document 7 in detail, the description is omitted.

In the coefficient update of the adaptive blocking matrix circuit, the enhanced interference becomes an unnecessary signal for coefficient update, and in the coefficient update of the multi-input canceller, the enhanced target signal becomes an unnecessary signal for coefficient update, both of which disturb coefficient update. As such, in either case, the adaptive filter coefficient is disturbed, so that uncomfortable breathing noises are caused in the output signal of the array processing device. In order to prevent the noises, it is necessary to make the coefficient update step size small. However, a small step size causes a delay of the speed with which the characteristics of the adaptive blocking matrix circuit follows the movement of the target signal, so that the quality of the adaptive array device output which is the final output is deteriorated. In order to solve this problem, adaptive mode control devices are disclosed in Non-Patent Documents 8 and 9.

In the method disclosed in Non-Patent Document 8, presence of the interference is detected using correlation between signals obtained from adjacent sensors. By halting coefficient update when the interference is detected, a fine output of the adaptive array device can be obtained. In this method, as it is developed to be applied for hearing aid, microphone intervals are wide, and the signal band is restricted from about 600 Hz to 1,200 Hz in order to prevent spatial aliasing. In an application of using normal audio signals, as the audio power may sometimes also be present outside this frequency range, presence of interferences cannot be detected accurately. Further, as it is configured to control coefficient update of only multi-input canceller while assuming a fixed blocking matrix circuit, it cannot be directly applied to the adaptive blocking matrix circuit.

In the method disclosed in Non-Patent Document 9, presence of interference is detected using a power ratio of the target signal to the interference (SIR). The power estimation of the target signal is performed using a fixed beamformer output. The power estimation of the interference is performed using an output of the adaptive blocking matrix circuit. The ratio of these estimation values (that is, estimation values of SIR) is compared with a threshold. If SIR is larger than the threshold, as the target signal is prevailing in the input signal and effects of the target signal are small, coefficient update will be performed in the adaptive blocking matrix circuit. In contrast, as the target signal interrupts coefficient update of the multi-input canceller, coefficient update of the multi-input canceller is halted. If SIR is smaller than the threshold, the coefficient update is halted in the adaptive blocking matrix circuit, and coefficient update is performed in the multi-input canceller.

In this method, the adaptive blocking matrix circuit does not exhibit sufficient performance until the adaptive filter coefficient included in the adaptive blocking matrix circuit is converged, so that estimation of the interference power becomes inaccurate. As such, particularly in the initial timing of operation, errors may be easily caused in the coefficient update control of the adaptive blocking matrix circuit and the multi-input canceller, leading to deterioration in the output audio of the array processing device. In order to solve this problem, Non-Patent Document 10 discloses an adaptive mode control means having a dedicated fixed blocking matrix circuit.

In the method disclosed in Non-Patent Document 10, power estimation of interference is performed using a dedicated fixed blocking matrix circuit. As such, desired performance can be achieved irrespective of the convergence of the adaptive filter coefficient included in the adaptive blocking matrix circuit, which enables accurate interference power estimation.

FIG. 31 shows a configuration in which the adaptive array processing device disclosed in Non-Patent Document 9 is combined with the adaptive mode control device disclosed in Non-Patent Document 10. The adaptive array processing device disclosed in Non-Patent Document 9 includes a fixed beamformer 200, an adaptive blocking matrix circuit 300, a delay element 400, and a multi-input canceller 500. Further, the adaptive mode control device includes a blocking matrix circuit 310, an SIR estimation section 700, and a comparator section 800.

The fixed beamformer 200 processes signals obtained from M pieces of sensors $100_0$ to $100_{M-1}$ to thereby enhance a target signal. The adaptive blocking matrix circuit 300 suppresses the target signal included in the plurality of sensor signals, and relatively enhances interference. This is achieved by generating pseudo target signals by a plurality of adaptive filters with an output of the fixed beamformer 200 being used as a reference signal, and subtracting them from signals obtained from M pieces of the sensors $100_0$ to $100_{M-1}$. The coefficient of the adaptive filter is updated such that an output of the adaptive blocking matrix circuit 300 is minimized, by using an output of the fixed beamformer 200 and an output of the adaptive blocking matrix circuit 300.

The delay element 400 delays an output of the fixed beamformer 200 by L sample, and supplies it to the multi-input canceller 500. The value of L is set such that the phases of the target signal component in the output of the delay element 400 and the target signal component in the output of the adaptive blocking matrix circuit 300 become the same. For example, it may be set to the sum of the group delay time of the fixed beamformer 200 and a time corresponding to about one fourth to a half of the number of taps of the adaptive blocking matrix circuit 300.

The multi-input canceller 500 receives and performs processing on a signal formed by delaying the output signal of the fixed beamformer 200 and an output signal of the adaptive blocking matrix circuit 300 to thereby suppress interference, and further enhances the target signal relatively. The multi-input canceller 500 receives the enhanced interference as a reference signal from the adaptive blocking matrix circuit 300, and as a signal correlated to this signal, generates a pseudo interference by adaptive filters. The generated pseudo interference is subtracted from the enhanced target signal which is an output of the delay element 400. This output is transmitted to the output terminal 600. The adaptive filter coefficient of the multi-input canceller 500 is updated, using the output of the adaptive blocking matrix circuit 300 and the output signal transmitted to the output terminal 600, so as to minimize the output signal.

The output of the adaptive blocking matrix circuit 300 to be used in coefficient update of the adaptive blocking matrix circuit 300 includes interference and a suppressed target signal. However, as the adaptive blocking matrix circuit 300 can affect only the target signal component, the interference is output as it is. In other words, the adaptive blocking matrix circuit 300 can minimize only the target signal component, and the interference component included in this output disturbs coefficient update. With the disturbing, the adaptive filter coefficient included in the adaptive blocking matrix circuit 300 is disordered, so that the signal transmitted to the multi-input canceller 500 becomes unstable. As a result, the output of the multi-input canceller 500, that is, the output of the entire adaptive array device, is disturbed, causing uncomfortable breathing noises. In order to prevent the noises, SIR is estimated using the plurality of sensor signals, and the coefficient update of the adaptive blocking matrix circuit 300 is controlled using the estimated value.

Similarly, the target signal enhanced in the coefficient update of the multi-input canceller 500 becomes an unnecessary signal for coefficient update, disturbing the coefficient update. With the disturbing, the adaptive filter coefficient included in the multi-input canceller 500 is disordered, causing uncomfortable breathing noises in the adaptive array device output. As such, same as the adaptive blocking matrix circuit 300, SIR of the plurality of sensor signals is estimated, and coefficient update of the multi-input canceller 500 is controlled with the estimated value.

The SIR estimation section 700 performs SIR estimation using the output of the blocking matrix circuit 310 and the output of the fixed beamformer 200. Power estimation of the target signal is performed using the output of the fixed beamformer. Power estimation of the interference is performed using the output of the fixed blocking matrix circuit. The two estimate values are supplied to the SIR estimation section 700, and the ratio is calculated to serve as an estimated SIR value. The estimated SIR value is transmitted from the SIR estimation section 700 to the comparator section 800. The comparator section 800 compares the estimated SIR value with a threshold.

If the estimated SIR value is larger than the threshold, as the target signal is prevailing in the input signal so that effect of the interference is small, a control signal for performing coefficient update in the adaptive blocking matrix circuit is generated, and the signal is supplied to the adaptive blocking matrix circuit 300. In contrast, as the target signal disturbs in the coefficient update of the multi-input canceller 500, a control signal for halting coefficient update of the multi-input canceller is generated, and the signal is supplied to the multi-input canceller 500. If the estimated SIR value is smaller than the threshold, coefficient is halted in the adaptive blocking matrix circuit, and a signal for performing coefficient update in the multi-input canceller is generated and supplied to the adaptive blocking matrix circuit 300 and the multiple input canceller 500, respectively.

The blocking matrix circuit 310 and the SIR estimation section 700 configures an identification information generation section 810. The SIR is a ratio of the target signal power and the interference power, and calculating the SIR corresponds to generating identification information of the target signal and the interference by amplitude. By comparing the identification information with the threshold, it is identified whether a target signal is prevailing or interference is prevailing. In other words, the identification information generation section 810 generates identification information by amplitude.

FIG. 32 shows an exemplary configuration of the blocking matrix circuit 310, which is configured of a subtractor 311 for calculating the difference between the $i^{th}$ sensor signal $X_i(k)$ and the $(i+1)^{th}$ sensor signal $X_{i+1}(k)$. Here, k is an indicator showing the time, and i is an integer in a range from 0 to M−2. The output signal z(k) of the blocking matrix circuit 310 becomes $X_i(k)-X_{i+1}(k)$. With respect to the target signal incoming from the front, z(k)=0 is established because $X_i(k)$ and $X_{i+1}(k)$ are equal. With respect to interference incoming from another direction, z(k) is not zero. As such, the blocking matrix circuit 310 has an advantage of suppressing the target signal.

Non-Patent Document 1: IEEE TRANSACTIONS ON ANTENNAS AND PROPAGATIONS, VOL. 30, NO. 1, PP. 27-34, January 1982

Non-Patent Document 2: IEEE TRANSACTIONS ON ANTENNAS AND PROPAGATIONS, VOL. 40, NO. 9, PP. 1093-1096, September 1992

Non-Patent Document 3: THE TRANSACTIONS OF THE INSTITUTE OF ELECTRONICS, INFORMATION AND COMMUNICATION ENGINEERS A, VOL. 79, NO. 9, PP. 1516-1524, September 1996

Non-Patent Document 4: PROCEEDINGS OF IEEE, VOL. 60, No. 8, PP. 926-935, August 1972

Non-Patent Document 5: IEEE PROCEEDINGS OF INTERNATIONAL CONFERENCE ON ACOUSTICS, SPEECH, AND SIGNAL PROCESSING, VOL. IV, PP. 269-272, April, 1994

Non-Patent Document 6: CH. 4, ARRAY SIGNAL PROCESSING, PRENTICE-HALL, ENGLEWOOD CLIFS, 1993

Non-Patent Document 7: MICROPHONE ARRAYS, SPRINGER, 2001

Non-Patent Document 8: JOURNAL OF ACOUSTICAL SOCIETY OF AMERICA, VOL. 91, NO. 3, PP. 1662-1676, March 1992

Non-Patent Document 9: IEEE PROCEEDINGS OF ICASSP, PP. 3605-3608, April 1998

Non-Patent Document 10: IEEE PROCEEDINGS OF ICASSP, PP. 949-952, March 1999

Non-Patent Document 11: CH1, MICROPHONE ARRAYS, SPRINGER-VERLAG, BERLIN, 2001.

Non-Patent Document 12: MULTIRATE SYSTEMS AND FILTER BANKS, PRENTICE-HALL, 1993.

DISCLOSURE OF THE INVENTION

Problems to be Solved by the Invention

In order to prevent distortion, the maximum interval between sensors, determined by the wavelength and the sound speed, is set. Further, the value of the number of pieces M of sensors also has an upper limit, practically. As such, the frequency characteristics of the fixed blocking matrix circuit which performs power estimation of interference are not flat, and also, selectivity based on directions is not enough. Accordingly, with the conventional art including that shown in FIG. 31, an error may not be avoidable in the power estimation depending on the frequency characteristics and incoming direction of interference, causing performance deterioration due to an inappropriate coefficient updating control of the adaptive array processing device.

It is an object of the present invention to provide an adaptive array processing device, an adaptive array processing method, and their program, which enables an accurate coefficient updating control irrespective of frequency characteristics and incoming directions of input signals to thereby acquire high-quality array processing outputs which are less influenced by frequency characteristics of input signals and directions of a target signal and interference.

Means for Solving the Problems

In order to achieve the above object, an adaptive array control device according to the present invention includes: a first identification information generation section which applies first array processing to signals acquired in a plurality of sensors arranged in an array and calculates a relative ratio between a target signal and interference based on phase information to thereby acquire first identification information; a correction signal generation section which generates a correction signal, using the first identification information, for performing larger correction when target signal power is higher than interference power; a second identification information generation section which calculates a relative ratio between the target signal and the interference based on amplitude information to thereby acquire second identification information; a correction section which corrects the second identification information according to the correction signal to thereby acquire corrected identification information; and a control section which controls speed and accuracy of parameter adjustment in adaptive array processing using the corrected identification information.

In order to achieve the above object, an adaptive array controlling method according to the present invention includes: applying first array processing to signals acquired in a plurality of sensors arranged in an array and calculating a relative ratio between a target signal and interference based on phase information to thereby acquire first identification information; generating a correction signal, using the first identification information, for performing larger correction when target signal power is higher than interference power; calculating a relative ratio between the target signal and the interference based on amplitude information to thereby acquire second identification information; correcting the second identification information according to the correction signal to thereby acquire corrected identification information; and controlling speed and accuracy of parameter adjustment in adaptive array processing using the corrected identification information.

In order to achieve the above object, an adaptive array controlling program causes a computer to perform functions of: applying first array processing to signals acquired in a plurality of sensors arranged in an array and calculating a relative ratio between a target signal and interference based on phase information to thereby acquire first identification information; generating a correction signal, using the first identification information, for performing larger correction when target signal power is higher than interference power; calculating a relative ratio between the target signal and the interference based on amplitude information to thereby acquire second identification information; correcting the second identification information according to the correction signal to thereby acquire corrected identification information; and controlling speed and accuracy of parameter adjustment in adaptive array processing using the corrected identification information.

In order to achieve the object, an adaptive array processing device according to the present invention includes: a sixth array processing section which enhances a target signal with respect to other signals to thereby acquire a sixth array-processed signal; a seventh array processing section which attenuates the target signal with respect to other signals to thereby acquire a seventh array-processed signal; a correlation elimination section which eliminates a signal component correlated to the seventh array-processed signal from the sixth array-processed signal and outputs the sixth array-processed signal; a first identification information generation section which applies first array processing to signals acquired in a plurality of sensors arranged in an array and calculates a relative ratio between the target signal and interference based on phase information to thereby acquire first identification information; a correction signal generation section which generates a correction signal, using the first identification information, for performing larger correction when target signal power is higher than interference power; a second identification information generation section which calculates a relative ratio between the target signal and the interference based on amplitude information to thereby acquire second identification information; a correction section which corrects the second identification information according to the correction signal to thereby acquire corrected identification information; and a control section which controls speed and accuracy of parameter adjustment in adaptive array processing using the corrected identification information.

In order to achieve the above object, an adaptive array processing method according to the present invention includes: enhancing a target signal with respect to other signals to thereby acquire a sixth array-processed signal; attenuating the target signal with respect to other signals to thereby acquire a seventh array-processed signal; when eliminating a signal component correlated to the seventh array-processed signal from the sixth array-processed signal and outputting the sixth array-processed signal, applying first array processing to signals acquired in a plurality of sensors arranged in an array and calculating a relative ratio between the target signal and interference based on phase information to thereby acquire first identification information; generating a correction signal, using the first identification information, for performing larger correction when target signal power is higher than interference power; calculating a relative ratio between the target signal and the interference based on amplitude information to thereby acquire second identification information; correcting the second identification information according to the correction signal to thereby acquire corrected identification information; and controlling speed and accuracy of parameter adjustment in adaptive array processing using the corrected identification information.

In order to achieve the above object, an adaptive array controlling program causes a computer to perform functions of: enhancing a target signal with respect to other signals to thereby acquire a sixth array-processed signal; attenuating the target signal with respect to other signals to thereby acquire a seventh array-processed signal; eliminating a signal component correlated to the seventh array-processed signal from the sixth array-processed signal and outputting the sixth array-processed signal; applying first array processing to signals acquired in a plurality of sensors arranged in an array and calculating a relative ratio between the target signal and interference based on phase information to thereby acquire first identification information; generating a correction signal, using the first identification information, for performing larger correction when target signal power is higher than interference power; calculating a relative ratio between the target signal and the interference based on amplitude information to thereby acquire second identification information; correcting the second identification information according to the correction signal to thereby acquire corrected identification information; and controlling speed and accuracy of parameter adjustment in adaptive array processing using the corrected identification information.

As described above, in an adaptive array control device, a controlling method and their program, and an adaptive array processing device, a controlling method and their program, identification information of a target signal and interference by amplitude is corrected according to identification information of the target signal and the interference by phase, and with use of the correction result, identification of the target signal and the interference is performed. More specifically, the present invention includes an identification information generation section according to phase, a correction signal generation section, and a correction section.

Effects of the Invention

With the configuration described above, in the present invention, as identification information of a target signal and interference by amplitude is corrected according to identification information of the target signal and the interference by phases, it is possible to acquire highly accurate identification information of the target signal and the disturbing in which the identification information by amplitude and the identification information by phase are combined. As such, coefficient updating control of the adaptive array processing device can be performed appropriately, whereby high-quality array processing outputs which are less influenced by the frequency characteristics and incoming directions of input signals can be acquired.

BEST MODE FOR CARRYING OUT THE INVENTION

Hereinafter, exemplary embodiments of the invention will be described according to the drawings.

First Exemplary Embodiment

FIG. 1 is a block diagram showing an adaptive array device having an adaptive array control device according to a first exemplary embodiment of the invention. The first exemplary embodiment includes, in the conventional adaptive array control device shown in FIG. 31, in addition to an identification information generation section configured of a blocking matrix circuit 310 and an SIR calculation section 700, an identification information generation section 820, a correction signal generation section 830, and a correction section 840 are included. The identification information generation section 850 configured of the identification information generation section 810, the identification information generation section 820, the correction signal generation section 830, and the correction section 840 provide the same function as that of the conventional identification information generation section 810. Hereinafter, configuration and effects will be described mainly based on the operations of the identification information generation section 820, the correction signal generation section 830, and the correction section 840.

The identification information generation section 820 generates information regarding identification of a target signal and interference according to phase information of signals obtained from M pieces of sensors $100_0$ to $100_{M-1}$. This information includes not only presence of target signals and interferences but also a relative ratio of both signals. The identification information obtained in the identification information generation section 820 is transmitted to the correction signal generation section 830. With use of the identification information supplied from the identification information generation section 820, the correction signal generation section 830 generates a correction signal for correcting the identification information supplied from the identification information generation section 810, and supplies it to the correction section 840. The correction section 840 corrects the identification information supplied from the identification information generation section 810 using the correction signal supplied from the correction signal generation section 830, and transmits the corrected identification information to the control section 800.

If the corrected identification information is larger than the threshold, the target signal is prevailing in the input signal, and influence of the interference is low. As such, a control signal for coefficient update is generated and supplied to the adaptive blocking matrix circuit 300. In contrast, as coefficient update of the multi-input canceller is disturbed by the target signal, a control signal for halting coefficient update of the multi-input canceller is generated and supplied to the multi-input canceller 500. If the corrected identification information is smaller than the threshold, coefficient update coefficient update is halted in the adaptive blocking matrix circuit, and a signal for performing coefficient update is generated in the multi-input canceller, and is supplied to the adaptive blocking matrix circuit 300 and the multi-input canceller 500, respectively. Further, the value of the corrected identification information calculated may be converted to a gain which takes a large value if the target signal is prevailing to the interference and takes a small value if it is not the case, and supplied to the adaptive blocking matrix circuit 300 and the multi-input canceller 500. However, it is assumed that the gain is normalized so as to have a value in a range between 0 and 1.

The adaptive blocking matrix circuit 300 and the multi-input canceller 500 can control speed and accuracy of coefficient update by replacing the product of the supplied gain and a coefficient update step size with the coefficient update step size. In the case of using an index which has a large value close to 1 with respect to interference and has small correlation with respect to a target signal instead of normalized mutual-correlation, the same effects can be achieved. Consequently, a coefficient update control can be performed with higher accuracy than the case of using a comparison result with the threshold.

FIG. 2 shows an exemplary configuration of the identification information generation section 820. The identification information generation section 820 is configured of leakage blocking matrix circuits 330 and 340, and a correlation section 920. Input signals of the leakage blocking matrix circuits 330 and 340 are equal to input/output signals of the conventional blocking matrix circuit 310. The leakage blocking matrix circuits 330 and 340 have symmetric structures, in which gains with respect to a target signal incoming from the front is the same, and have spatial selectivity for attenuating the target signal. On the other hand, a phase different between output signals of the leakage blocking matrix circuits 330 and 340 with respect to interference incoming from a direction other than the front becomes a large value near 180 degrees. The output signals of the leakage blocking matrix circuits 330 and 340 are supplied to the correlation calculation section 920. The correlation calculation section 920 calculates mutual-correlation between outputs of the leakage blocking matrix circuits 330 and 340, and transmits it to the correction signal generation section 830.

As a correlation, a normalized mutual-correlation which is a result of dividing a value obtained by accumulating a product of respective output samples of the leakage blocking matrix circuits 330 and 340 with respect to a plurality of past samples, by a product of square root of a result of accumulating respective samples of the outputs of the leakage blocking matrix circuits 330 and 340 with respect to a plurality of past sample respectively, for example. A normalized mutual-correlation $\gamma(n)$ in a sample n, determined as described above, is given by the following expression:

[Expression 1]

$$\gamma(n) = \frac{\sum_{k=0}^{N-1} v_1^2(n-k) \cdot v_2(n-k)}{\sqrt{\sum_{k=0}^{N-1} v_1^2(n-k)} \cdot \sqrt{\sum_{k=0}^{N-1} v_2^2(n-k)}} \quad (1)$$

Here, $v_1(n)$ and $v_2(n)$ are outputs of the leakage blocking matrix circuits 330 and 340, respectively. With an assumption that an input signal is white, the Expression (1) can be approximated by the following expression:

[Expression 2]

$$\gamma(n) \approx \tilde{\gamma}(\rho, \vartheta) = \frac{\sum_{i=0}^{N-1} \{G^2(i, \theta) \cdot \cos[\varphi(i, \theta] + \rho \cdot G^2(i, 0)\}}{\sum_{i=0}^{N-1} \{G^2(i, \theta) + \rho \cdot G^2(i, 0)\}} \quad (2)$$

Here, $G(i,\theta)$ is a (common) gain of the leakage blocking matrix circuits 330 and 340 with respect to the $i^{th}$ frequency component and a direction $\theta$, $\phi(i, \theta)$ is a phase difference between output signals of the leakage blocking matrix circuits 330 and 340 with respect to the $i^{th}$ frequency component and a direction $\theta$, and $\rho$ is an actual SIR. $G(i,\theta)$ can be calculated from actual configurations of the leakage blocking matrix circuits 330 and 340.

With respect to a target signal incoming from the front, outputs of the leakage blocking matrix circuits 330 and 340 are equal, and a normalized mutual-correlation with respect to them has a large value near 1. On the other hand, with respect to interference incoming from a direction other than the front, as outputs of the leakage blocking matrix circuits 330 and 340 have a large phase difference, the normalized mutual-correlation becomes small. Accordingly, by transmitting the normalized mutual-correlation calculated by the correlation calculation section 920 to the control section 800, and with use of a relationship with a predetermined threshold, a coefficient update control signal of the adaptive blocking matrix circuit 300 and the multi-input canceller 500 can be generated.

Although operation has been described here by means of an example of a normalized mutual-correlation, any index can be used if it has a large value near 1 with respect to a target signal and has small correlation with respect to interference. In contrast, the same effect can be expected even with an index having a large value near 1 with respect to interference and has small correlation with respect to a target signal.

FIG. 3 shows an exemplary configuration of the leakage blocking matrix circuit 330. In FIG. 3, the blocking matrix circuit 330 is configured of multipliers $331_1$ to $331_{M-2}$, subtractors $3320$ to $332_{M-2}$, and an adder 333. The multipliers $331_1$ to $331_{M-2}$ multiplies $g_i$ by $i^{th}$ ($i$ is an integer from 1 to M−2) sensor signal $x_i(k)$, and outputs the product $g_ix_i(k)$. The subtractor $332_i$ ($i$ is an integer from 0 to M−2) calculates a difference $z_i(k)=x_{M-1}(k)-g_ix_i(k)$ between the M−1$^{th}$ sensor signal $x_{M-1}(k)$ and an output of the multiplier $331_i$, and transmits to the adder 333. Here, $i$ is an integer in a range from 1 to M−2. The subtractor $332_0$ calculates a difference $z_0(k)=x_{M-1}(k)-x_0(k)$ between the M−1$^{th}$ sensor signal $x_{M-1}(k)$ and the 0$^{th}$ sensor signal $x_0(k)$, and transmits to the adder 333. The adder 333 adds all of the M−1 pieces of input signals, and outputs the addition result as $z_3(k)$. That is, $z_3(k)$ is given by the Expression (3).

[Expression 3]

$$z_3(k) = (M-1)x_{M-1}(k) - \sum_{m=1}^{M-2} g_m x_m(k) - x_0(k) \tag{3}$$

FIG. 4 shows an exemplary configuration of the leakage blocking matrix circuit 340. In FIG. 4, the blocking matrix circuit 340 is configured of multipliers $341_1$ to $341_{M-2}$, subtractors $342_1$ to $342_{M-1}$, and an adder 343. The multipliers $341_1$ to $341_{M-2}$ multiplies $g_i$ by $i^{th}$ ($i$ is an integer from 1 to M−2) sensor signal $x_i(k)$, and outputs the product $g_ix_i(k)$. The subtractor $342_i$ ($i$ is an integer of from 1 to M−1) calculates a difference $z_i(k)=x_0(k)-g_ix_i(k)$ between the 0$^{th}$ sensor signal $x_0(k)$ and an output of the multiplier $341_i$, and transmits to the adder 343. Here, $i$ is an integer in a range of M−2 from 1. The subtractor $342_{M-1}$ calculates a difference $z_{M-1}(k)=x_0(k)-x_{M-1}(k)$ between the 0$^{th}$ sensor signal $x_0(k)$ and the M−1$^{th}$ sensor signal $x_{M-1}(k)$, and transmits to the adder 343. The adder 343 adds all of the M−1 pieces of input signals, and outputs the addition result as $z_4(k)$. That is, $z_4(k)$ is given by the Expression (4).

[Expression 4]

$$z_4(k) = (M-1)x_0(k) - \sum_{m=1}^{M-2} g_m x_m(k) - x_{M-1}(k) \tag{4}$$

Assuming that the signal source is provided at a sufficiently distant, all signals incoming to a sensor can be expressed with reference to any one of the signals. Now, assuming that $x_0(k)$ is a reference signal, $x_i(k)$ can be expressed by the following expression.

[Expression 5]

$$x_i(k) = z^{-iD} x_0(k) \tag{5}$$

Here, $z^{-iD}$ is a delay corresponding to an interval between adjacent sensors. By applying the Expressions (5), (3) and (4), the Expressions (6) and (7) are established.

[Expression 6]

$$z_3(k) = x_0(k)\left\{(M-1)z^{-(M-1)D} - \sum_{m=1}^{M-2} g_m z^{-mD} - 1\right\} \tag{6}$$

[Expression 7]

$$z_4(k) = x_0(k)\left\{(M-1) - \sum_{m=1}^{M-2} g_m z^{-mD} - z^{-(M-1)D}\right\} \tag{7}$$

When the gains $G_3(k)$ and $G_4(k)$ of the leakage blocking matrix circuits 330 and 340 from the Expressions (6) and (7), the Expressions (8) and (9) are established.

[Expression 8]

$$G_3(k) = (M-1)z^{-(M-1)D} - \sum_{m=1}^{M-2} g_m z^{-mD} - 1 \tag{8}$$

[Expression 9]

$$G_4(k) = (M-1) - \sum_{m=1}^{M-2} g_m z^{-mD} - z^{-(M-1)D} \tag{9}$$

When applying, to the Expressions (8) and (9), conditions that both of the gains $G_3(k)$ and $G_4(k)$ of the leakage blocking matrix circuits 330 and 340 becomes $G(k)$, the Expression (10) is established.

[Expression 10]

$$\sum_{m=1}^{M-2} g_m[z^{(m-M+1)D} + z^{(M-1-m)D}] = \sum_{m=1}^{M-2} g_m(z^{-mD} + z^{mD}) \tag{10}$$

In order that the Expression (10) is established,

[Expression 11]

$$g_m = g_{M-1-m} \tag{11}$$

is to be established.

This indicates that multiplier coefficients of the leakage blocking matrix circuits 330 and 340 are symmetrical. Further, as multiplying all multiplier coefficients by a constant is equal to multiplying outputs by a constant, the leakage blocking matrix circuits 330 and 340 may be configured to multiply $x_0(k)$ and $x_{M-1}(k)$ by a constant and then supply to a corresponding subtractor. If a planar wave is assumed, signals incoming from an orthogonal angle with respect to a sensor array are all equal. When applying the Expression (11) after the Expressions (3) and (4), and then applying the Expression (5) where D=0, $z_3(k)=z_4(k)$. That is, with respect to a signal incoming from the front, outputs of the leakage blocking matrix circuits 330 and 340 are equal.

Assuming that $g_m=g_L$ to all m with respect to the leakage blocking matrix circuits 330 and 304 shown in FIGS. 3 and 4, when the number of sensors is M, the gain $G(i,\theta)$ included in the Expression (2) is given by the following Expression.

[Expression 12]

$$G(i, \theta) = \left\{ \sum_{m=1}^{M-2} \left( \left[ \begin{array}{c} (M-1)^2 + 1 + \\ (M-2)g_L^2 \end{array} \right] + \left[ \begin{array}{c} 2(M-2-m)g_L^2 + \\ (4-2M)g_L \end{array} \right] \cdot \cos\left[ \frac{2\pi m i f_s}{N} t_0(\theta) \right] \right) - 2(M-1) \cdot \cos\left[ \frac{2\pi(M-1)i f_s}{N} t_0(\theta) \right] \right\}^{1/2} \quad (12)$$

As obvious from FIGS. 3 and 4, the leakage blocking matrix circuits 330 and 340 have symmetrical structures, and satisfy the Expression (11). Particularly, when $g_i=1$ (i is an integer from 1 to M−2), the leakage blocking matrix circuits 330 and 340 have the configurations shown in FIGS. 5 and 6, respectively. Due to the symmetric property of the structures, respective output signals $z_3(k)$ and $z_4(k)$ provide a large phase difference particularly in a low frequency with respect to interference incoming from a direction other than the front. Further, with respect to a target signal incoming from the front, $z_3(k)=z_4(k)=0$ is established. Accordingly, to the target signal, the normalized mutual-correlation between $z_3(k)$ and $z_4(k)$ becomes zero.

Originally, as the normalized mutual-correlation should be zero with respect to interference, the target signal and the interference are not distinguishable in this state. As such, $g_i \neq 1$ (i is an integer from 1 to M−2) is set. Such a value of $g_i$ causes $z_3(k)$ and $z_4(k)$ to leak the target signal to thereby prevent the normalized mutual-correlation from becoming zero.

The normalized mutual-correlation calculated by the correlation calculation section 920 using outputs of the leakage blocking matrix circuits 330 and 340 configured as described above generates a large difference with respect to the target signal and the interference, which enables to accurately distinguish the target signal and the interference using the normalized mutual-correlation. This means a target signal block where the target signal is prevailing and an interference block where the interference is prevailing can be separated accurately. Further, instead of deciding (hard decision) one of the target signal block and the interference block, it is possible to continuously decide (soft decision) intermediate states between the both.

Based on information of the target signal block and the interference block with high accuracy obtained in this manner, by controlling parameters determining the following property and operation accuracy of adaptive filters such as coefficient update step size and forgetting coefficient, coefficient update of the adaptive array processing device can be controlled appropriately. Consequently, a high quality array processing output less influenced by the frequency characteristics of input signals and directions of the target signal and the interference can be obtained.

FIGS. 7 and 8 show second exemplary configurations of the leakage blocking matrix circuits 330 and 340. Compared with FIGS. 3 and 4, the sensor signals $x_{M-3}(k)$ and $x_2(k)$ are not used. Corresponding to this, the configuration does not include the multiplier $331_{M-3}$ and a subtractor $332_{M-3}$, and a multiplier $341_2$ and a subtractor $342_2$. In other words, each of the leakage blocking matrix circuits 330 and 340 may be configured such that a path corresponding to a pair of sensors having the widest interval has no multiplier, and other paths are symmetrically provided with a coefficient $g_i$ and a subtractor.

FIGS. 9 and 10 show third exemplary configurations of the leakage blocking matrix circuits 330 and 340. Compared with FIGS. 7 and 8, a sensor signal $x_0(k)$ is not used. When paying attention to sensor signals $x_1(k)$ to $x_{M-1}(k)$, the same configuration as that of FIGS. 7 and 8 is adopted. That is, the leakage blocking matrix circuits 330 and 340 may be configured such that one of signals corresponding to a pair of sensors having the widest interval is not used, and a path corresponding to a pair of sensors having a second widest interval do not have a multiplier, and other paths has a symmetric configuration in which coefficient and a subtractor are arranged.

FIGS. 11 and 12 show fourth exemplary configurations of the leakage blocking matrix circuits 330 and 340. Compared with FIGS. 9 and 10, a sensor signal $x_{M-1}(k)$ is not used. When paying attention to sensor signals $x_1(k)$ to $x_{M-2}(k)$, the same configuration as that of FIGS. 7 and 8 is adopted. That is, the leakage blocking matrix circuits 330 and 340 may be configured such that signals corresponding to a pair of sensors having the widest interval are not used, and a path corresponding to the closest pair of sensors interposed between them does not have a multiplier, and other paths has a symmetric configuration in which coefficient and a subtractor are arranged.

FIG. 13 shows a fifth exemplary configuration of the leakage blocking matrix circuit 330. In FIG. 13, the blocking matrix circuit 330 is configured of multipliers $331_i$ and $331_{i+1}$, and a subtractor $332_i$ (i is an integer from 1 to M−2). The multiplier $331_i$ multiplies $g_i$ by the i$^{th}$ sensor signal $x_i(k)$, and outputs the product $g_i x_i(k)$. The multiplier $331_{i+1}$ multiplies $g_{i+1}$ by the i+1$^{th}$ sensor signal $x_{i+1}(k)$, and outputs the product $g_{i+1} x_{i+1}(k)$. The subtractor $332_i$ calculates a difference $z_3(k)=g_{i+1}x_{i+1}(k)-g_i x_i(k)$ between an output of the multiplier $331_{i+1}$ and an output of the multiplier $331_i$, and outputs it. Note that when the conditions of the Expression (11) are applied, $g_{i+1}=g_i$ is established. Further, it is needless to say that such coefficients may be arranged after the subtractor $332_i$. The configuration of that case is the same as that shown in FIG. 32.

FIG. 14 shows a fifth exemplary configuration of the leakage blocking matrix circuit 340. In FIG. 14, the blocking matrix circuit 340 is configured of multipliers $341_i$ and $341_{i+1}$, and a subtractor $342_i$ (i is an integer from 1 to M−2). The multiplier $341_i$ multiplies $g_i$ by the i$^{th}$ sensor signal $x_i(k)$, and outputs the product $g_i x_i(k)$. The multiplier $341_{i+1}$ multiplies $g_{i+1}$ by the i+1$^{th}$ sensor signal $x_{i+1}(k)$, and outputs the product $g_{i+1} x_{i+1}(k)$. The subtractor $342_i$ calculates a difference $z_4(k)=g_i x_i(k)-g_{i+1}x_{i+1}(k)$ between an output of the multiplier $341_i$ and an output of the multiplier $341_{i+1}$, and outputs it. Note that when the conditions of the Expression (11) are applied, $g_i=g_{i+1}$ is established. Further, it is needless to say that such coefficients may be arranged after the subtractor $342_i$.

Five exemplary configurations regarding the leakage blocking matrix circuits 330 and 340 have been described. In these five exemplary configurations, the number of pairs of sensor signals combined via internal subtractors and corresponding sensor intervals are different. It is configured that outputs of all subtractors are set to have values which are close to zero with respect to a target signal incoming from the front. Outputs of the subtractors will not become zero with respect to interference incoming from a direction other than the target signal. In other words, each of the subtractor outputs functions as a blocking matrix circuit independently. However, each of the subtractor outputs has different frequency response and directivity. This is due to the following two grounds.

First, a relative delay between two sensor signals which are subtractor inputs is given in a form that a product of a distance between sensors and sine of the signal incoming direction is divided by sound velocity. Further, distances between sensors are different in all subtractor outputs. The frequency characteristics and directivity of subtractor outputs become functions of distances between sensors. This means, in turn, subtractor outputs corresponding to different distances between sensors have different frequency characteristics and directivity. This is correct even if subtractors and adders are exchanged. However, the different point is that a gain becomes an inverse number of a gain of a subtractor. In the case of using an adder, a target signal is enhanced. The frequency characteristics and spatial selectivity in that case are disclosed in FIG. 1.1 of Non-Patent Document 11.

In the case of subtractors, it is clearly understood that it is only necessary to take inverse numbers of the characteristics shown in FIG. 1.1 of Non-Patent Document 11 and normalizing them. Referring to FIG. 1.1, if distances between sensors are constant, it is found that the spatial selectivity becomes steeper as the input signal frequency becomes higher. In a low frequency, the beam angle is wide, and the spatial selectivity deteriorates. If applying this to the case of the subtractors, in a low frequency, the sensitivity is low with respect to a target signal incoming from the front direction, and the sensitivity is high with respect to a direction off the front. However, transition from the direction of low sensitivity to the direction of high sensitivity is slow, so sufficient spatial selectivity cannot be achieved. On the other hand, if a sensor interval becomes wider, a relative delay becomes larger, so steep spatial selectivity can be achieved.

According to this principle, in the five exemplary configurations regarding the leakage blocking matrix circuits 330 and 340, a plurality of differences between signals acquired from pairs of sensors having different intervals are calculated, and by adding them, blocking matrix circuits having comprehensively excellent spatial selectivity are acquired. With this configuration, differences between signal pairs obtained from sensors of wide intervals act effectively with respect to low-frequency signals, and differences between signal pairs obtained from sensors of narrow intervals act effectively with respect to high-frequency signals, and excellent spatial selectivity can be realized with respect to wide-band signals. As such, the leakage blocking matrix circuits 330 and 340 can suppress the target signal with excellent frequency characteristics and spatial selectivity. In the five exemplary configurations, as different subtractor outputs are used respectively, different spatial selectivity can be realized. Of course, the spatial selectivity is more excellent as the number of types of substrate outputs is larger, and the order is exemplary configuration 1, 2, 3, 4, and 5.

A common aspect of blocking matrix circuits configuring those pairs is that the structure is symmetry and a gain with respect to the front is equal. This has been shown in Expression (11). As such, outputs are equal with respect to a target signal, and a phase difference between outputs with respect to interference becomes a value close to 180 degrees. Accordingly, the correlation between these blocking matrix circuit outputs is large with respect to a target signal, and is small with respect to interference. As long as these characteristics are held, the blocking matrix circuits configuring these pairs may take any structures. For example, the configuration of the blocking matrix circuits 330 and 340 can be the one in which a plurality of blocking matrix circuits corresponding to a plurality of sensor intervals are combined. In this example, null can be formed in the target signal direction by adjusting the filter characteristics in the filter-and-sum beamformer described above. Array processing for forming such null is performed respectively for a plurality of times corresponding to a plurality of sensor intervals, and the results can be combined.

The correction signal generation section 830 generates a correction signal used in the correction section 840 using normalized mutual-correlation supplied from the identification information generation section 820. As obvious from the Expression (2), the normalized mutual-correlation $\hat{\gamma}$ becomes a function of $\rho$ which is an actual SIR, and the range is between $-1$ to $+1$. In particular, if the normalized mutual-correlation $\hat{\gamma}$ takes a large value, the target power is extremely larger than the interference power. In that case, the correction signal generation section 830 generates a large gain K ($\hat{\gamma}$). If it is not the case, the correction signal generation section 830 generates a small gain K ($\hat{\gamma}$). Accordingly, the gain K ($\hat{\gamma}$) becomes an increase function of $\hat{\gamma}$. In other words, the gain is determined such that a larger correction will be performed when the target signal power is larger than the interference power. As an example of such a function, a linear function in a log domain of $\hat{\gamma}$ hat may be considered. That is, it is a gain K ($\hat{\gamma}$) having a linear relationship with the log of $\hat{\gamma}$ hat, which can be expressed as the Expression (13).

[Expression 13]

$$K(\hat{\gamma})=\delta\cdot(\hat{\gamma}-\hat{\gamma}_r) \quad (13)$$

Here, $\delta$ and $\gamma_T$ are constants. In order to set these constants, two conditions are required. A first condition is when identification between a target signal and interference is unnecessary, that is, when $\rho=0$ dB. At this time, as it is required that the Expression (2) is also satisfied, $\rho=0$ dB can be made in the Expression (2). However, as $\gamma$ hat also depends on the signal incoming direction $\theta$, it cannot be determined uniquely. An example of changes of $\gamma$ hat changes with respect to various $\theta$ has been shown in FIG. 16. Here, considering that to which $\theta$ the gain K is most important, it is easily understood that it is a smaller $\theta$. This is because, with respect to a smaller $\theta$, in array processing in which a target signal is assumed to be incoming from the front, identification between a target signal and interference becomes difficult, and the accuracy of the estimated SIR becomes low. For an SIR of low estimation accuracy, the necessity of correction increases.

Now, in the graph as shown in FIG. 16, if the minimum value of the estimated interference incoming direction is set, the value of $\gamma$ hat corresponding to $\theta$ min which is the direction thereof may be set to be $\gamma_T$. If the steering is non-zero, it is only necessary to correct θmin corresponding to the steering amount to thereby set the value of $\gamma_T$. Determination of δ which is another constant has trade-off. The value of δ is determined while considering the correction level of an SIR estimated in an actual environment for obtaining a value closet to the actual SIR. For example, in the case of using a microphone array consisting of four microphones in a typical room, an appropriate correction was achieved by setting δ to be 70. It should be noted that although an example of using a linear function of γ hat in calculation of K in the correction signal generation section 830 has been described, it is clearly understood that this may be any function or polynomial.

The gain K acquired by the function designed in this manner is transmitted to the correction section 840. The correction section 840 multiplies the estimation SIR supplied from the identification information generation section 810 by the gain K supplied from the correction signal generation section 830, and transmits the product to the control section 800. Although an example of multiplies the correction in the correction section 840 multiplies the gain K, it is clearly understood that correction defined by simple addition, a more complicated function, polynomial or the like, other than multiplication, can be applied.

FIG. 15 shows a second exemplary configuration of the identification information generation section 820. The second exemplary configuration of the identification information generation section 820 is configured such that a filter 334 is provided between the leakage blocking matrix circuit 330 and the correlation calculation section 920 and a filter 344 is provided between the leakage blocking matrix circuit 340 and the correlation calculation section 920, in the first exemplary configuration shown in FIG. 2. The filters 334 and 344 are designed such that a frequency, where the spatial selectivity defined by the blocking matrix circuits 330 and 340, in particular, attenuation characteristics with respect to a direction other than the front becomes flat with respect to a direction, becomes a pass band thereof.

With the filters 334 and 344, the mutual-correlation calculated by the correlation calculation section 920 with use of output signals of these filters causes a large difference between a target signal and interference, whereby distinction between a target signal and interference using mutual-correlation can be performed accurately. This means a target signal block where a target signal is prevailing and an interference block where interference is prevailing can be separated. Other operations and their effects are the same as those of the first exemplary configuration which have been described using FIG. 2.

In the above description, a value of a parameter $g_i$ in the first and second exemplary embodiments of the identification information generation section 820 has not been discussed. However, it has been described that in order to prevent output signals of the leakage blocking matrix circuits 330 and 340 from becoming zero with respect to the target signal, the value must be other than 1. As such, if $g_i \neq 1$, it is understood that the value of $g_i$ is preferably around 1 in order to cause a large phase difference. Actually, when calculating a normalized mutual-correlation with an assumption that a signal incoming to the sensor is a white signal, it becomes a function of a phase difference ø of true SIR ρ, a signal incoming direction θ, and output signals of the leakage blocking matrix circuits 330 and 340.

When calculating gains and phases of the leakage blocking matrix circuits 330 and 340 with an assumption that the range of signal incoming direction θ is 30 to 90 degrees, the signal band is 500 to 1500 Hz, and the number of sensors is 4, a normalized mutual-correlation γ hat can be plotted with respect to a particular SIR ρ. In the case of the signal incoming direction θ being on the horizontal axis and the normalized mutual-correlation γ hat being plot on the vertical axis with respect to ρ=0 dB and ρ=−∞ dB, FIG. 16 is obtained.

As it is preferable that only a single γ hat is determined with respect to θ of wide range, the locus of a γ hat value is preferably near horizon. Further, ranges of γ hats corresponding to ρ=0 dB and ρ=−∞ dB must not overlap each other. This is for obtaining clearly different γ hats for ρ=0 dB in which target signal and interference is combined at the almost same ratio and for ρ=−∞ dB in which the power of interference is overwhelmingly higher with respect to a target signal. When plotting a γ hat with respect to $g_i$ near 1 in these conditions, the optimum value of $g_i$ is 0.92. FIG. 16 shows a locus of a γ hat acquired with respect to the optimum value $g_i$=0.92 in the above conditions, provided that the pass band of the filters 334 and 344 is set to be 500 to 1,500 Hz in correspondence with the voice.

FIG. 17 shows a third exemplary configuration of the identification information generation section 820. The third exemplary configuration of the identification information generation section 820 includes, in the second exemplary configuration, a leakage blocking matrix circuit 350 and a filter 354, and a leakage blocking matrix circuit 360 and a filter 364, in addition to the leakage blocking matrix circuit 330 and the filter 334 and the leakage blocking matrix circuit 340 and the filter 344. The leakage blocking matrix circuit 360 is for providing an effect to a high-range signal with respect to the leakage blocking matrix circuit 330 acting mainly on a low-range signal by the filter 334. As such, the pass band of the filter 364 is set to be higher than the passband of the filter 334 and to cover wider frequency bands when the pass bands of the filters 334 and 364 are combined.

That is, the processing performed by the leakage blocking matrix circuit 330 in the first exemplary configuration is to be performed by the leakage blocking matrix circuits 330 and 360 for respective frequency bands. An output of the filter 364 is transmitted to the multiplier 365. The multiplier 365 enhances a high-frequency component so as to almost equal the power of an output of the filter 364 and the power of an output of the filter 334. For example, if a signal band to be input to a sensor is 8 kHz, a coefficient of the multiplier 365 can be set to be around 3. An output of the multiplier 365 is transmitted to the adder 336, and is added to the output of the filter 334. The addition result is supplied to the correlation calculation section 920.

Similarly, the leakage blocking matrix circuit 350 is for providing an effect to a high-range signal with respect to the leakage blocking matrix circuit 340 mainly acting on a low-range signal by the filter 344. As such, the pass band of the filter 354 is set to be higher than the pass band of the filter 344 and cover wider frequency bands when the filters 344 and the 354 are combined. An output of the filter 354 is transmitted to the multiplier 355. The multiplier 355 enhances a high frequency component so as to almost equal the power of an output of the filter 354 and the power of an output of the 344. Accordingly, the coefficient of the multiplier 355 can be the same value as the coefficient of the multiplier 365. An output of the multiplier 355 is transmitted to the adder 346, and is added to an output of the filter 344. The addition result is supplied to the correlation calculation section 920.

With the leakage blocking matrix circuits 350 and 360 and the filters 354 and 364, as a signal component of a frequency band, which has not been used when they were not present, can be used, mutual-correlation calculated by the correlation calculation section 920 causes a large difference between a target signal and an interference, so that distinction between the target signal and the interference using mutual-correlation can be performed accurately. This means a target signal block where a target signal is prevailing and an interference block where interference is prevailing can be distinguished accurately. Other operations and their effects are the same as those of the first exemplary embodiment which have been described using FIG. 1.

As obvious from the above description, the leakage blocking matrix circuits 350 and 360 have symmetric configurations and the same $g_i$ value, which is the same as the leakage blocking matrix circuit 330 and 340. FIGS. 18 and 19 show examples of a phase difference ø of an output signal caused by the combination of the leakage blocking matrix circuits 330 and 340, and a phase difference ø of an output signal caused by the combination of the leakage blocking matrix circuits 350 and 360, respectively. It is calculated that the number of sensors is 4, and the signal band is 8,000 Hz, and the vertical axis is indicated as cosine (COS ø) of a phase difference ø. From these drawings, it is found that when the signal incoming direction DOA is close to 0, the cosine value is 1 regardless of the frequency. This corresponds to the target signal.

On the other hand, if the signal incoming direction DOA is distant from 0, the cosine value is −1 in only a specific frequency band. This corresponds to interference. The frequency bands where the cosine value becomes −1 are different in FIGS. 18 and 19, and the central frequency is about 1,000 Hz in FIG. 18, and is about 3,000 Hz in FIG. 19. That is, a frequency band where the normalized mutual-correlation becomes −1 with respect to interference is higher in FIG. 19. Accordingly, by processing outputs of the leakage blocking matrix circuits 330 and 340 and outputs of the leakage blocking matrix circuits 350 and 360 by bandpass filters which pass corresponding frequency bands respectively, a phase difference between a pair of leakage blocking matrix circuit outputs can be calculated as an index which becomes 1 with respect to a target signal and becomes −1 with respect to interference.

In the third exemplary configuration described using FIG. 17, an input signal to the correlation calculation section 920 has been calculated using two pairs of leakage blocking matrix circuits. However, it is clearly understood that the number of pairs of leakage blocking matrix may be increased. Next, a method of designing a leakage coefficient $g_i$ in a leakage blocking matrix circuit in the case that there are a plurality of pairs of leakage blocking matrix circuits will be described.

FIG. 20 is a flowchart showing a design procedure of a leakage coefficient $g_i$ in a leakage blocking matrix circuit. First, a signal band which should be processed by a pair of object leakage blocking matrix circuits and a minimum value θ min of a signal incoming direction (DOA) θ considered as interference are designated (S101). Next, a leakage coefficient $g_i$ considered as appropriate is set (S102). According to these settings, the γ hat when the actual power ratio (SIR) ρ of the target signal to the interference is 0 dB is calculated using the Expression (2) with respect to θ which is larger than θ min and smaller than 90 degrees. The gain G (i, θ) in the Expression (2) can be calculated corresponding to the configuration of the leakage blocking matrix circuit if it is determined. The gain in the case of using the configurations shown in FIGS. 3 and 4 becomes the one shown in the Expression (12). Similarly, the γ hat when ρ is ∞ dB is calculated with respect to θ which is larger than θ min and smaller than 90 degrees (S103).

It is checked whether or not the loci cross each other when these ρ are shown as in FIG. 16 (S104). When they cross each other, the signal incoming direction (DOA) θ corresponding to a node corresponds to both ρ=0 dB and ∞ dB, so it is impossible to distinguish a state where the power of a target signal and the power of interference is almost equal and a state where the power of a target signal is overwhelmingly higher than the power of interference. As this phenomenon is caused by the value of a leakage coefficient $g_i$ which has been set primarily, the processing so far is again performed using another leakage coefficient $g_i$. If no locus crosses, the leakage coefficient $g_i$ and data of the γ hat corresponding to ρ=0 dB is stored (S105).

Here, if evaluation is performed with another leakage coefficient $g_i$, the procedure up to this point is repeated from the start (S106). Up to this point, data of γ hat corresponding to at least one leakage coefficient $g_i$ have to be obtained. Further, if data of γ hat corresponding to a plurality of leakage coefficients $g_i$ are obtained up to this point, one value is selected. This selection is performed in the following procedure.

First, it is checked whether there is a leakage coefficient $g_i$ in which the polarity of γ min hat and the polarity of γ max hat is opposite (S107).

Here, γ min hat and γ max hat are the minimum value and the maximum value of γ hat respectively obtained when changing θ with ρ=0 dB. When such a leakage coefficient $g_i$ is present, a leakage coefficient $g_i$ in which the absolute value of the average of γ min hat and γ max hat becomes the minimum is selected (S108). This indicates that γ hat obtained when changing θ with ρ=0 dB is distributed around zero, and the accuracy of calculating ρ from γ hat can be high. If there is no leakage coefficient $g_i$ satisfying the above conditions, $g_i$ where distribution with respect to θ of γ hat when ρ=0 dB becomes the minimum is selected (S109).

By repeating the above procedures with respect to different frequency bands, a configuration having a plurality of pairs of leakage blocking matrix circuits can be designed. At this time, although respective frequency bands are selected in a manner of not overlapping each other basically, a serious problem will not be caused unless they overlap in an extremely large amount. As described above, with a plurality of pairs of vertical connections of leakage blocking matrix circuits and filters being provided, signal components of frequency bands which have not been used when those pairs were not present can be used. As such, a mutual-correlation calculated by the correlation calculation section 920 causes a large difference between a target signal and interference, and distinction between the target signal and the interference using mutual-correlation can be performed accurately. This means that a target signal block where the target signal is prevailing and an interference block where the interference is prevailing can be separated accurately. Other operations and their effects are the same as those of the first exemplary embodiment which has been described using FIG. 1.

FIG. 21 shows a second exemplary configuration of the identification information generation section 810. The difference from FIG. 31 in which the first exemplary configuration is a gain control section 900. The gain control section 900 corrects an estimation value of the target signal power adaptively corresponding to the characteristics of the target signal. As such, it is possible to enhance a specific frequency component adaptively to thereby realize a frequency and spatial selectivity having high flatness, so that the target signal power can be estimated accurately. The target signal power, which is estimated accurately, is transmitted to the SIR estimation section and used for SIR calculation. Based on the estimated SIR value with high accuracy acquired in this manner, it is possible to appropriately control coefficient update of the adaptive array processing device by controlling parameters determining the following property and the operational accuracy of adaptive filters such as a coefficient update step size and a forgetting coefficient. As a result, it is possible to acquire high-quality array processing outputs which are less influenced by the frequency characteristics of input signals and directions of the target signal and the interference.

FIG. 22 shows an exemplary configuration of the gain control section 900. The gain control section 900 includes a storage section 901, a Fourier transform section 902, an analyzing section 903, a gain calculation section 904, a spectrum correcting section 905, an inverse Fourier transform section 906, and a storage section 907. An output of the fixed beamformer 200 is supplied to the storage section 901 and is framed. The framed signal is transmitted to the Fourier transform section 902 and is applied with Fourier transform. The Fourier transform result is supplied to the analyzing section 903 and the spectrum correcting section 905. The analyzing section 903 analyzes the input signal using the Fourier transform result, and detects an input signal having a specific characteristic. The information regarding the characteristics of the input signal and the detection result are transmitted to the gain calculation section 904. Although typical information regarding the characteristics of the input signal is spectrum, the amount of characteristic such as cepstrum and information in which cepstrum is thinned out may be used in place of spectrum. The gain calculation section 904 calculates a correction gain corresponding to the input signal, and supplies it to the spectrum correcting section 905.

An example of a specific characteristic may be fricative sound. It is known that the frequency spectrum of a fricative sound has a power up to a higher range, and is flat compared with a non-fricative sound. With these facts, an appropriate correction gain can be obtained according to the power value in a high range and flatness of spectrum. Specifically, a high-range power and spectrum flatness are compared with reference values, and a value according to the magnitude relationship may be set as a correction gain. Further, in a simpler example, if the high range power and spectrum flatness are larger than the predetermined threshold, a correction gain may be set to a value other than 1, and if not, a correction gain may be set to 1. The value of correction gain may be the same or different for respective frequency components.

The spectrum correcting section 905 corrects spectrum by correcting the Fourier transform result supplied from the Fourier transform section 902 by using one or more correction gains supplied from the gain calculation section 904. Specifically, the spectrum correcting section 905 corrects amplitude or power of the Fourier transform result with a correction gain, and supplies the result to the inverse Fourier transform section 906. The phase information is directly supplied to the inverse Fourier transform section 906 without any correction. The inverse Fourier transform section 906 applies inverse Fourier transform to the data supplied from the spectrum correcting section 905, and transmits the result to the storage section 907. The storage section 907 outputs stored data by one sample to thereby apply inverse-frame to the signal sample. It is clearly understood that the Fourier transform section 902 and the inverse Fourier transform section 906 may be replaced with another pair of transform/inverse transform processing. Examples of such transform include cosine transform, correction discrete cosine transform also known as MDCT, Hadamard transform, and Haar transform. Further, prior to such transform processing, or following inverse transform processing, window processing using a window function may be performed so as to improve accuracy of a high-range component, particularly.

FIG. 23 shows another exemplary configuration of the gain control section 900. The gain control section 900 shown in FIG. 3 includes a band division filter bank 911, an analyzing section 912, a gain calculation section 913, a spectrum correcting section 914, and a band synthesis filter bank 915. An output of the fixed beamformer 200 is supplied to the band division filter bank 911, and is divided into a plurality of frequency bands. Signals of the respective frequency bands are supplied to the analyzing section 912 and the spectrum collecting section 914. Operation of the analyzing section 912 and the gain calculation section 913 are the same as those of the analyzing section 903 and the gain calculation section 904. The spectrum correcting section 914 uses one or more correction gains supplied from the gain calculation section 913 to correct the level of each frequency band signal, and transmits the result to the band synthesis filter bank 915. The band synthesis filter bank 915 synthesizes data supplied from the spectrum correcting section 914, converts into a whole band signal, and outputs the result. Different from the exemplary configuration shown in FIG. 22, the present exemplary configuration is capable of performing equivalent processing by sequential processing without accumulating signal samples in the storage circuit. As such, a delay due to a gain control can be reduced, and the following characteristics with respect to the varying system will be increased.

It should be noted that the respective frequency bands of the band division filter bank and the band synthesis filter bank may have equal or unequal intervals. In this case, by dividing the band in unequal intervals, it is possible to lower the time resolution by dividing the bank to have narrow bands in the low frequency and to increase the time resolution by dividing the bank to have wide bands in the high frequency. Typical unequal division includes octave division in which the band becomes a half sequentially toward a lower band, and critical band division corresponding to human auditory characteristics. It has been known that unequal division has high consistency with audio signals, particularly. It should be noted that as the detail of the band division filter bank and the band synthesis filter bank and their design method are disclosed in Non-Patent Document 12, they are omitted.

FIG. 24 shows a third exemplary embodiment of the identification information generation section 810. A difference from that shown in FIG. 21 showing the second exemplary configuration is a multiple blocking matrix circuit 320. Hereinafter, configuration and effects will be described mainly based on the operation of the multiple blocking matrix circuit 320.

Input/output signals of the multiple blocking matrix circuit 320 are equal to the input/output signals of the blocking matrix circuit 310 of the second exemplary configuration. FIG. 25 shows a first exemplary configuration of the multiple blocking matrix circuit 320. In FIG. 25, the multiple blocking matrix circuit 320 includes subtractors $321_0$ to $321_{M-1}$ and an adder 322. The configuration of FIG. 25 is the same as the configuration of FIG. 6 which has been described above, the effects thereof are also the same.

FIG. 26 shows a second exemplary configuration of the multiple blocking matrix circuit 320. In FIG. 26, the multiple blocking matrix circuit 320 includes subtractors $321_0$ to $321_{M-1}$, filters $323_0$ to $323_{M-1}$, and an adder 322. A subtractor i calculates a difference $z_i(k)=X_0(k)-X_i(k)$ between the first sensor signal $X_0(k)$ and the $i^{th}$ sensor signal $X_i(k)$, and transmits the difference to the filter $323_i$. A signal i is an integer in the range from 0 to M−2. The filter $323_i$ transmits a signal component of a pass band to the adder 322. The adder 322 adds all of the M−1 pieces of input signals, and output the addition result as z(k). The pass band of the filter $323_i$ is determined by the microphone interval between the $0^{th}$ and the $i^{th}$. The filter $323_i$ is designed such that the frequencies in which the directivity determined by the $0^{th}$ and the $i^{th}$ microphone signals, particularly, attenuation characteristics with respect to directions other than the front, become flat with respect to the directions, becomes a pass band.

The multiple blocking matrix circuit 320 may have another configuration. In a series array configured of M pieces of sensors, an interval between two sensors is set to be D, 2D, 3D, - - - or (M−1)D, from the shortest. There are M−1 pairs of sensors in which the sensor interval is D, and M−2 pairs of sensors in which the sensor interval is 2D, and similarly, there are one pair in which the sensor interval is (M−1)D. Accordingly, the multiple blocking matrix circuit 320 exhibits the above-described effects as long as it has a configuration such that a pair of sensors corresponding to each sensor interval is set, and differences between signals obtained therefrom are calculated, and the differences are added by the adder 322. Such an exemplary configuration is shown in FIG. 27 as a third exemplary configuration. In FIG. 27, operation of the subtractors $321_0$ and $321_{M-2}$ is different from that shown in FIG. 26. Although, in FIG. 26, those subtractors output differential signals corresponding to sensor intervals D and (M−1)D, in FIG. 27, they output differential signals corresponding to sensor intervals (M−1)D and D. Besides, various similar configurations can be adopted. It should be noted that it is clearly understood that a configuration not having the filters $323_0$ to $323_{M-1}$ is also acceptable in FIG. 27.

Even in the case of a configuration not using signals corresponding to specific sensor intervals in FIG. 26, a blocking effect of a target signal is higher than that of the conventional blocking matrix circuit 310. FIG. 28 shows a fourth exemplary configuration of the multiple blocking matrix circuit 320. Compared with FIG. 26, FIG. 28 does not include the subtractor $321_1$. As such, as there is no differential signal corresponding to a sensor interval of 2D, no effect caused by the sensor interval 2D is expectable. However, with signals corresponding to other sensor intervals, it is possible to obtain the blocking matrix circuit having comprehensively-excellent spatial selectivity, although it is less than the example of FIG. 26. It should be noted that it is clearly understood that a configuration not having the filters $323_0$ to $323_{M-1}$ is also acceptable in FIG. 28.

The configuration of the blocking matrix circuit 320 can be the one in which a plurality of blocking matrix circuits corresponding to a plurality of sensor intervals are combined. For example, null can be formed in the target signal direction by adjusting the filter characteristics in the filter-and-sum beamformer described above. Array processing for forming such null is performed independently for a plurality of times corresponding to a plurality of sensor intervals, and the results can be combined.

FIG. 29 shows a fourth exemplary configuration of the identification information generation section 810. The relationship between the fourth exemplary configuration and the third exemplary configuration shown in FIG. 24 is the same as the relationship between the first exemplary configuration described in FIG. 31 and the second exemplary configuration described in FIG. 21, and a difference is only the gain control section 900. Accordingly, as the operation and effects have been clear, the description is omitted.

Second Exemplary Embodiment

FIG. 30 is a block diagram showing an adaptive array device having an adaptive array control device according to a fourth exemplary embodiment of the invention. The second exemplary embodiment of the invention includes a computer (CPU; processor; data processing device) 1000 which operates in accordance with a program control, input terminals $101_0$ to $101_{M-1}$, and an output terminal 600. The computer (CPU; processor; data processing device) 1000 includes the fixed beamformer 200, the adaptive blocking matrix circuit 300, the delay element 400, the multi-input canceller 500, the identification information generation sections 810 and 820, the correction signal generation section 830, the correction section 840, and the controller 800.

Target signals and interferences supplied to the input terminals $101_0$ to $101_{M-1}$ are supplied to the array processing device in the computer 1000 where the interferences are suppressed. The main components of the array processing device are the fixed beamformer 200, the adaptive blocking matrix circuit 300, the delay element 400, and the multi-input canceller 500. The adaptive mode control device including the identification information generation sections 810 and 820, the correction signal generation section 830, the correction section 840 and the control section 800 controls accuracy and coefficient updating speed of adaptive filters included in the adaptive blocking matrix circuit 300 and the multi-input canceller 500.

The adaptive mode control device receives outputs of a group of a plurality of sensors, corrects identification information of the target signal and the interference by amplitude, according to identification information of the target signal and the interference by phase, and performs identification of the target signal and the interference using the correction result. Whereby, highly accurate identification information of the target signal and the interference, in which identification information by amplitude and identification information by phase are combined, can be acquired. As such, a coefficient updating control of the adaptive array processing device can be performed appropriately, so high-quality array processing outputs can be obtained.

Although description has been given above using microphones as sensors, sensors such as ultrasonic sensors, sonar receivers, and antennas may be used instead of microphones.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

According to the present invention, a coefficient updating control of an adaptive array processing device can be performed appropriately, so that it is possible to obtain high-quality array processing outputs which is less influenced by the frequency characteristics of input signals and directions of a target signal and interference. Accordingly, it is possible to enhance and receive only a specific signal from among a plurality of signal sources. This method is widely applicable to acquisition of audio signals by adaptive microphone array, and wireless transmission-reception devices by means of sonar and adaptive antenna array in the hydroacoustic field, providing large effects on businesses of those fields.

DESCRIPTION OF REFERENCE NUMERALS

Figure 1:
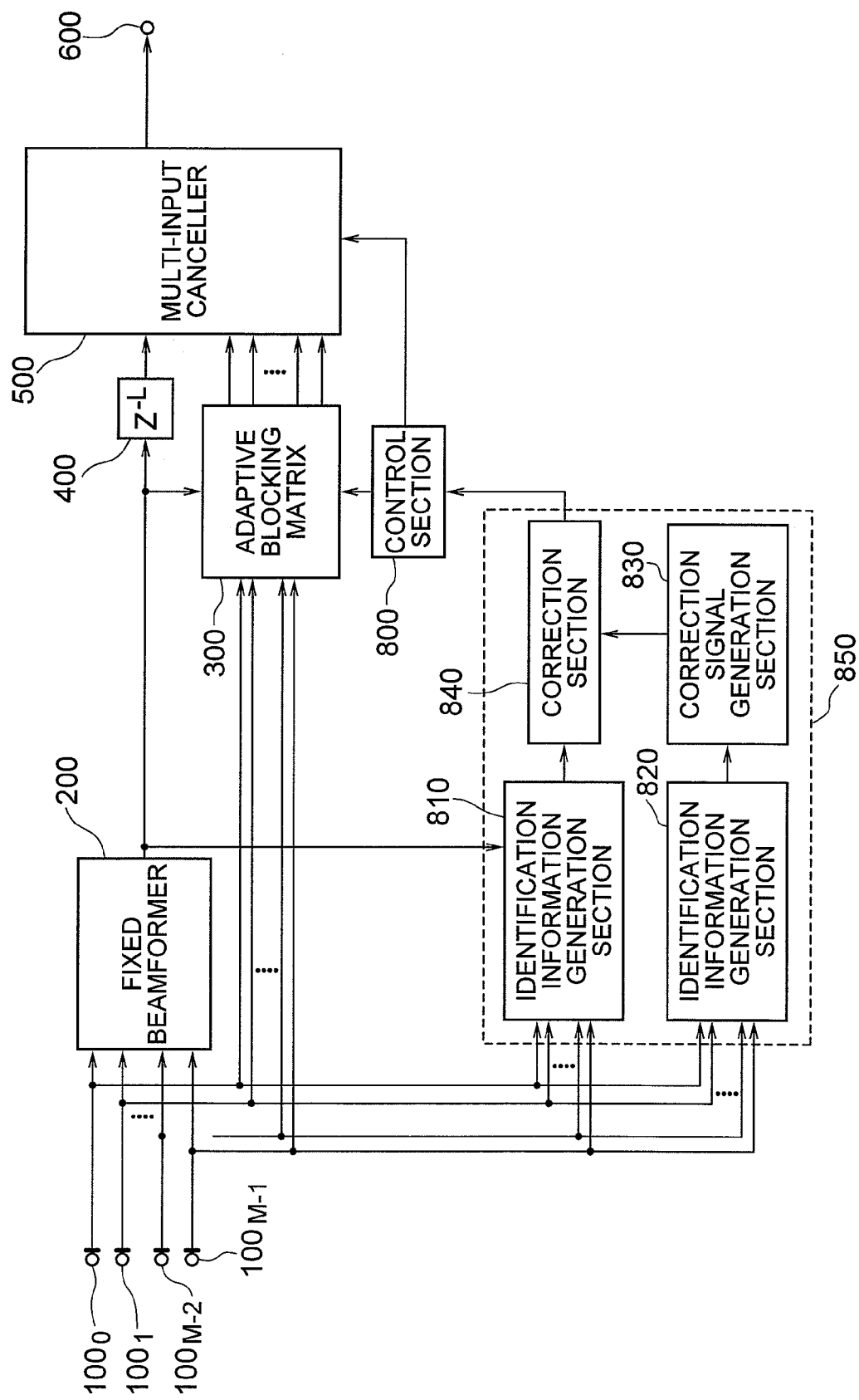
FIG. 1 is a block diagram showing an adaptive array device having an adaptive array control device according to a first exemplary embodiment of the invention.
Figure 2:
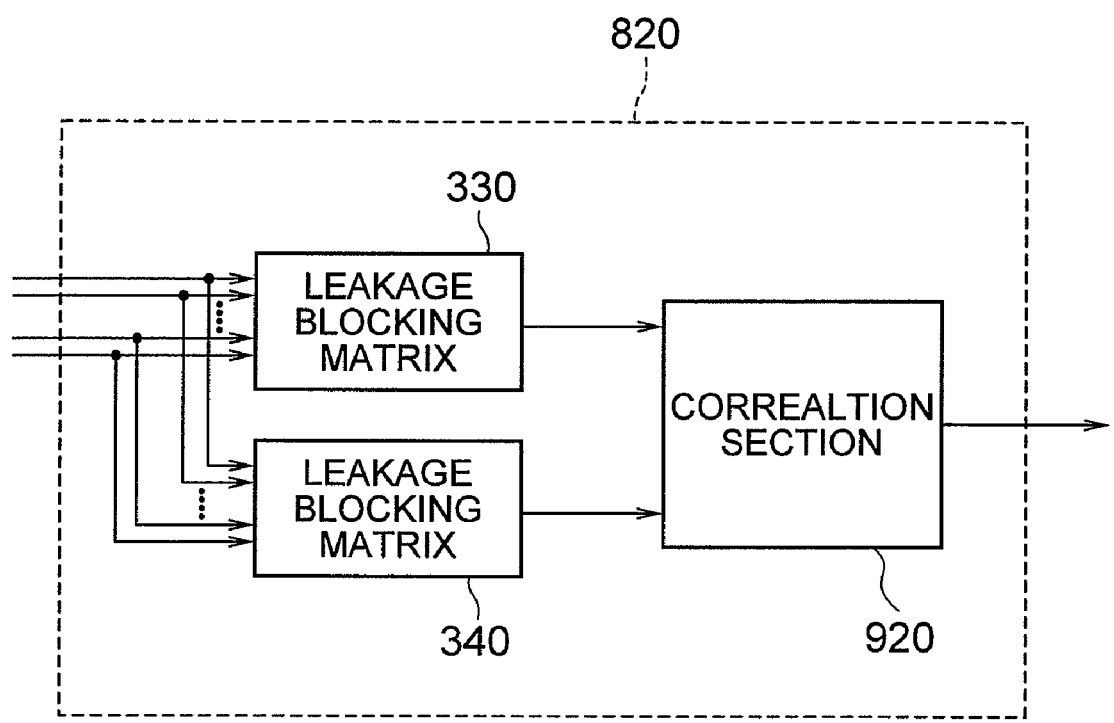
FIG. 2 is a block diagram showing a first exemplary embodiment of the identification information generation section 820.
Figure 3:
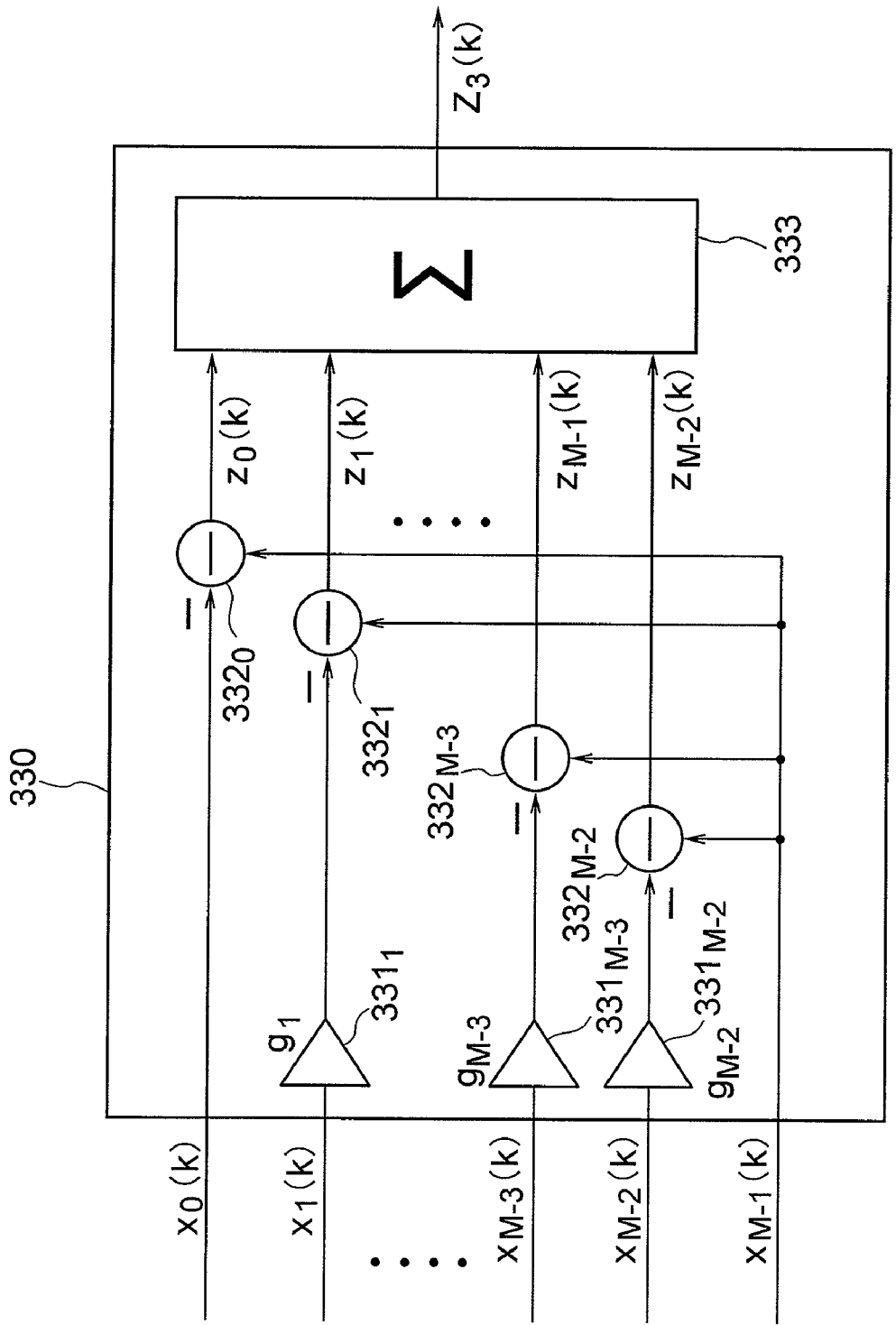
FIG. 3 is a block diagram showing a first exemplary configuration of the leakage blocking matrix circuit 330.
Figure 4:
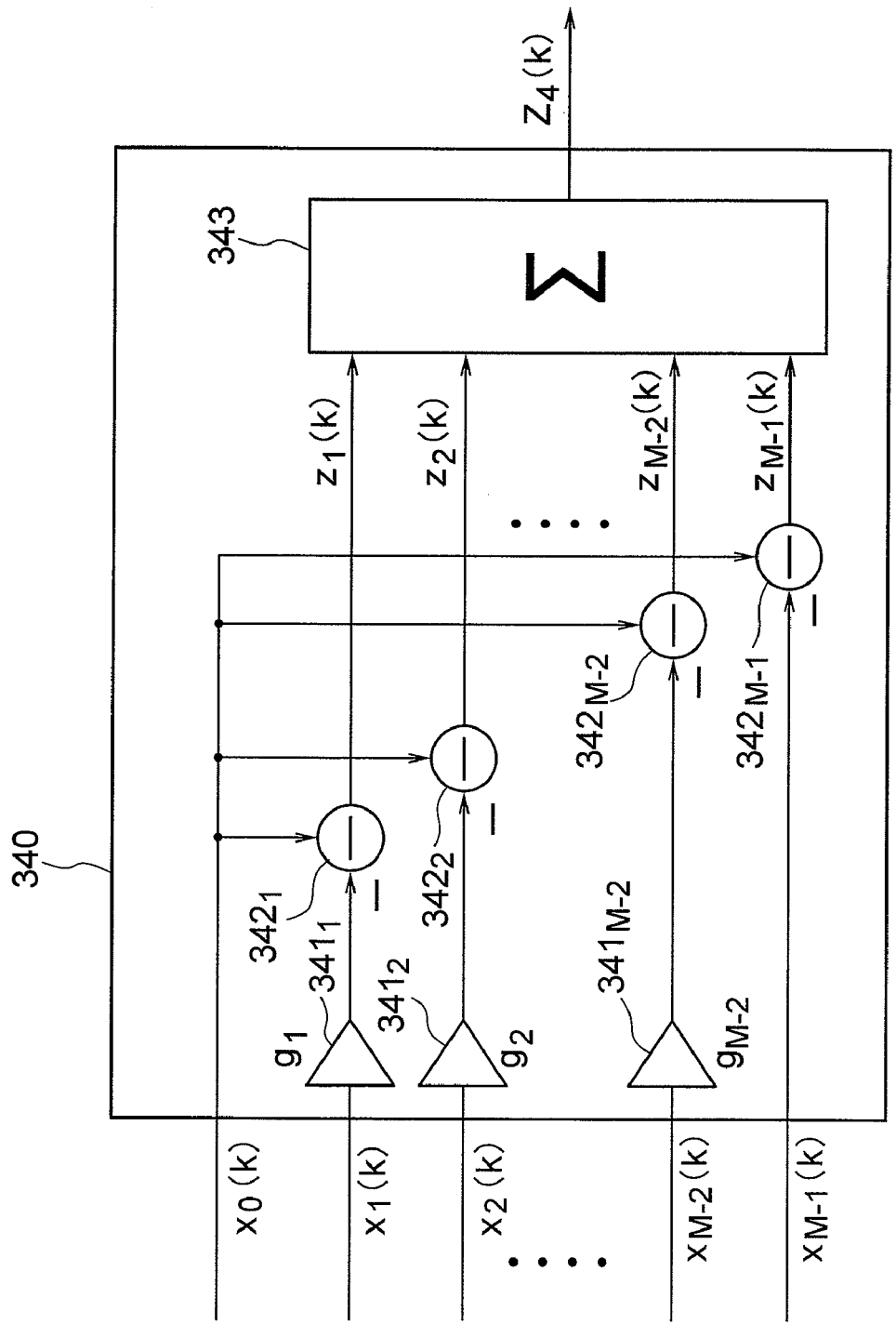
FIG. 4 is a block diagram showing a first exemplary configuration of the leakage blocking matrix circuit 340.
Figure 5:
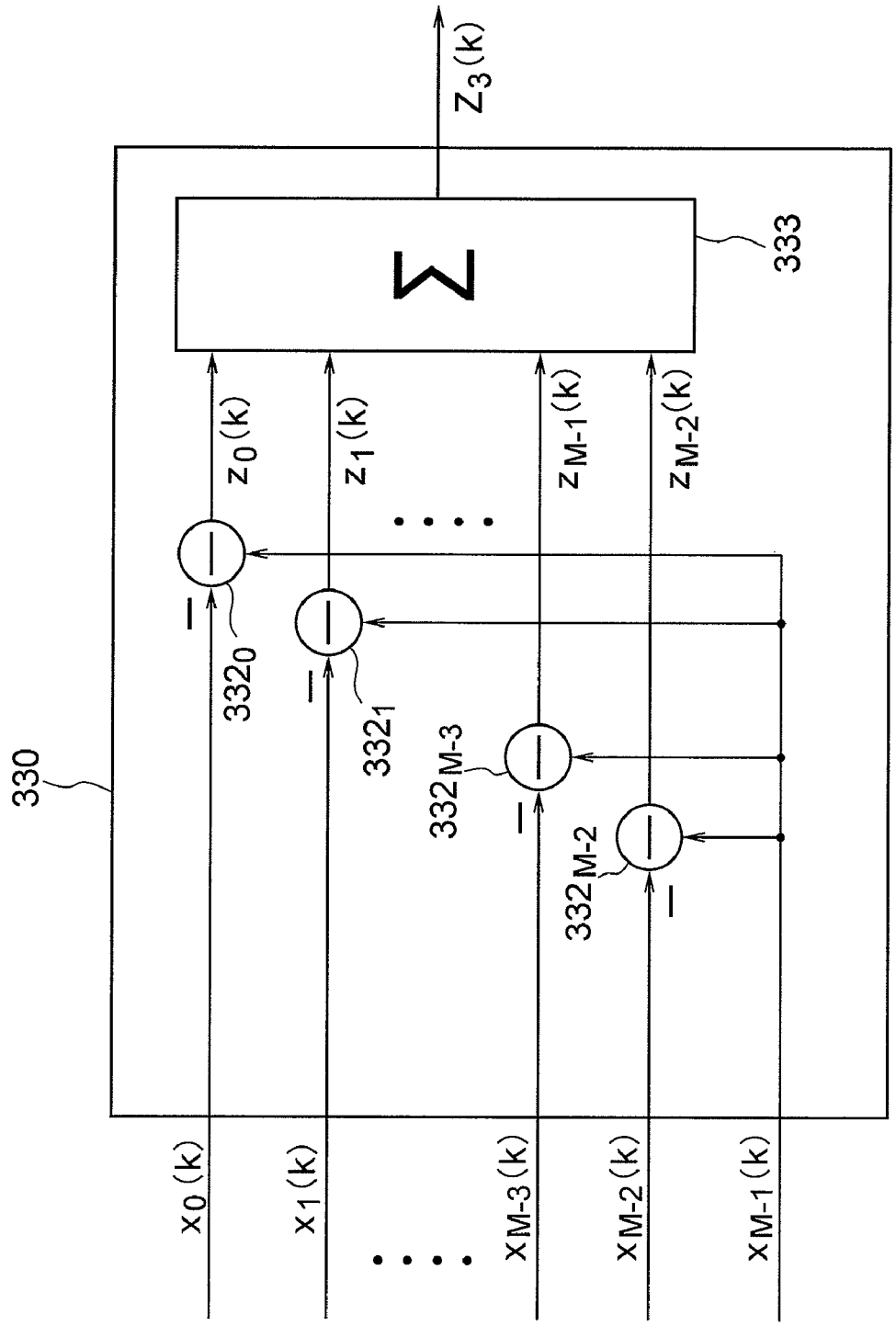
FIG. 5 is a block diagram showing an exemplary configuration in which leakage of the leakage blocking matrix circuit 330 is zero.
Figure 6:
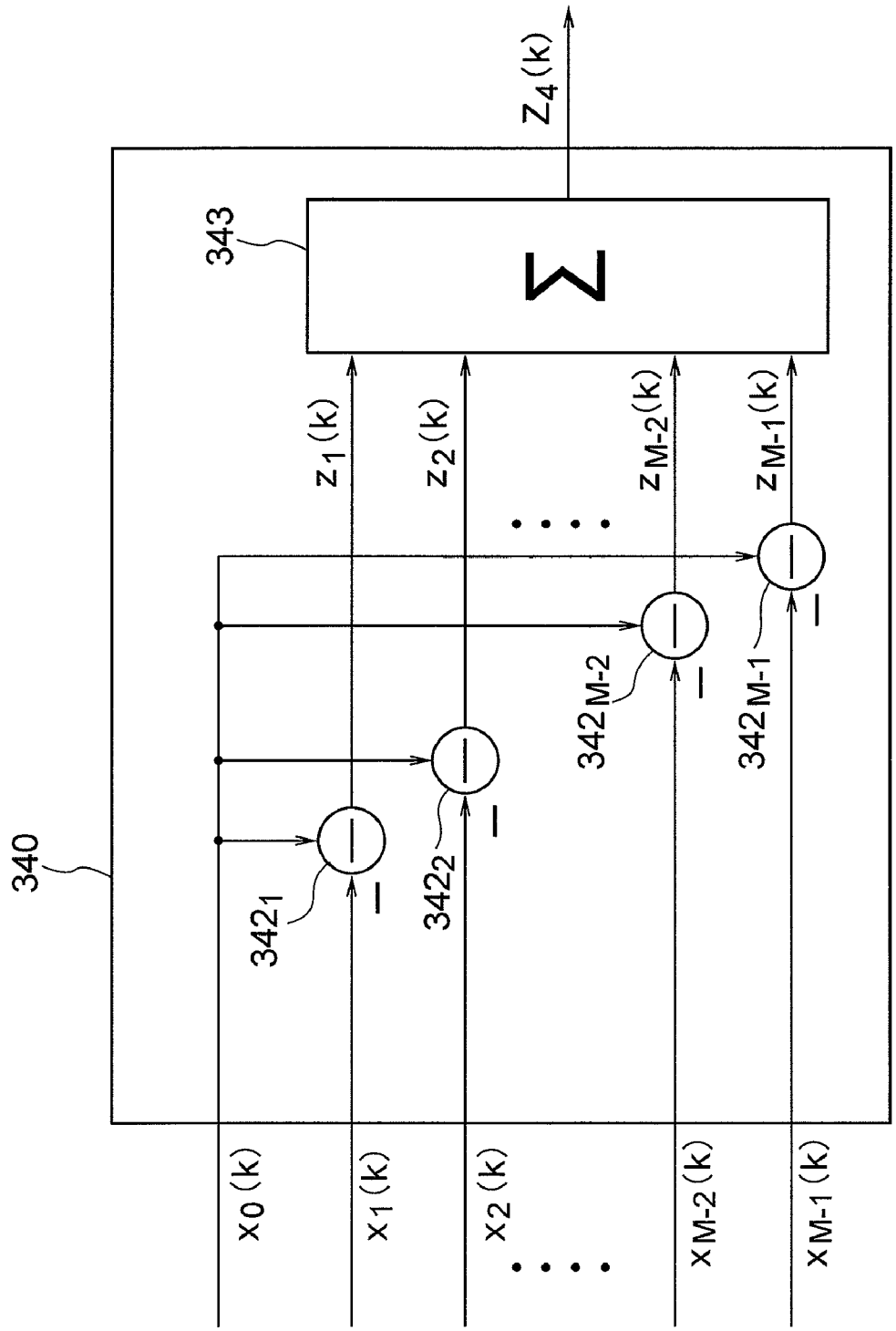
FIG. 6 is a block diagram showing an exemplary configuration in which leakage of the leakage blocking matrix circuit 340 is zero.
Figure 7:
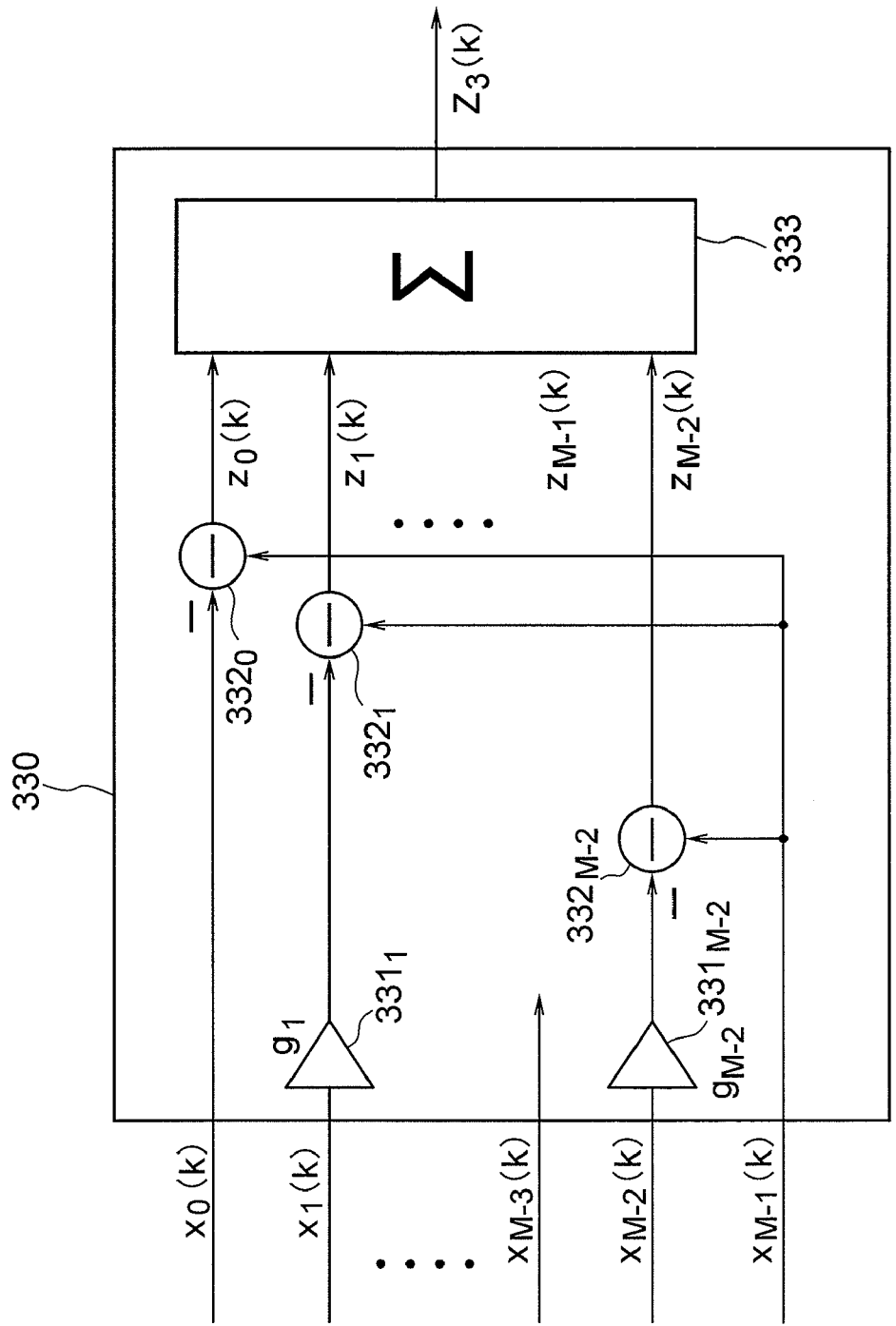
FIG. 7 is a block diagram showing a second exemplary configuration of the leakage blocking matrix circuit 330.
Figure 8:
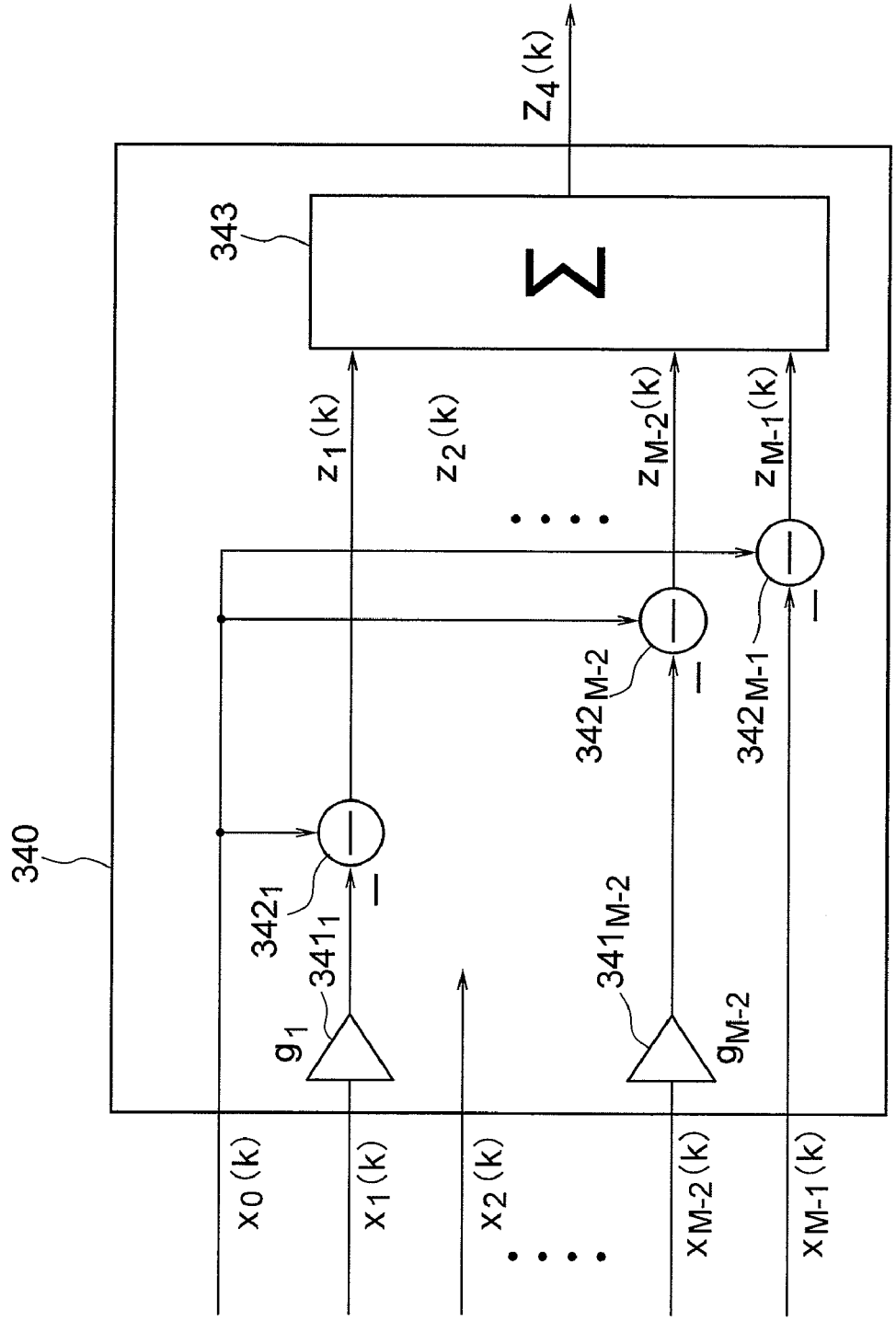
FIG. 8 is a block diagram showing a second exemplary configuration of the leakage blocking matrix circuit 340.
Figure 9:
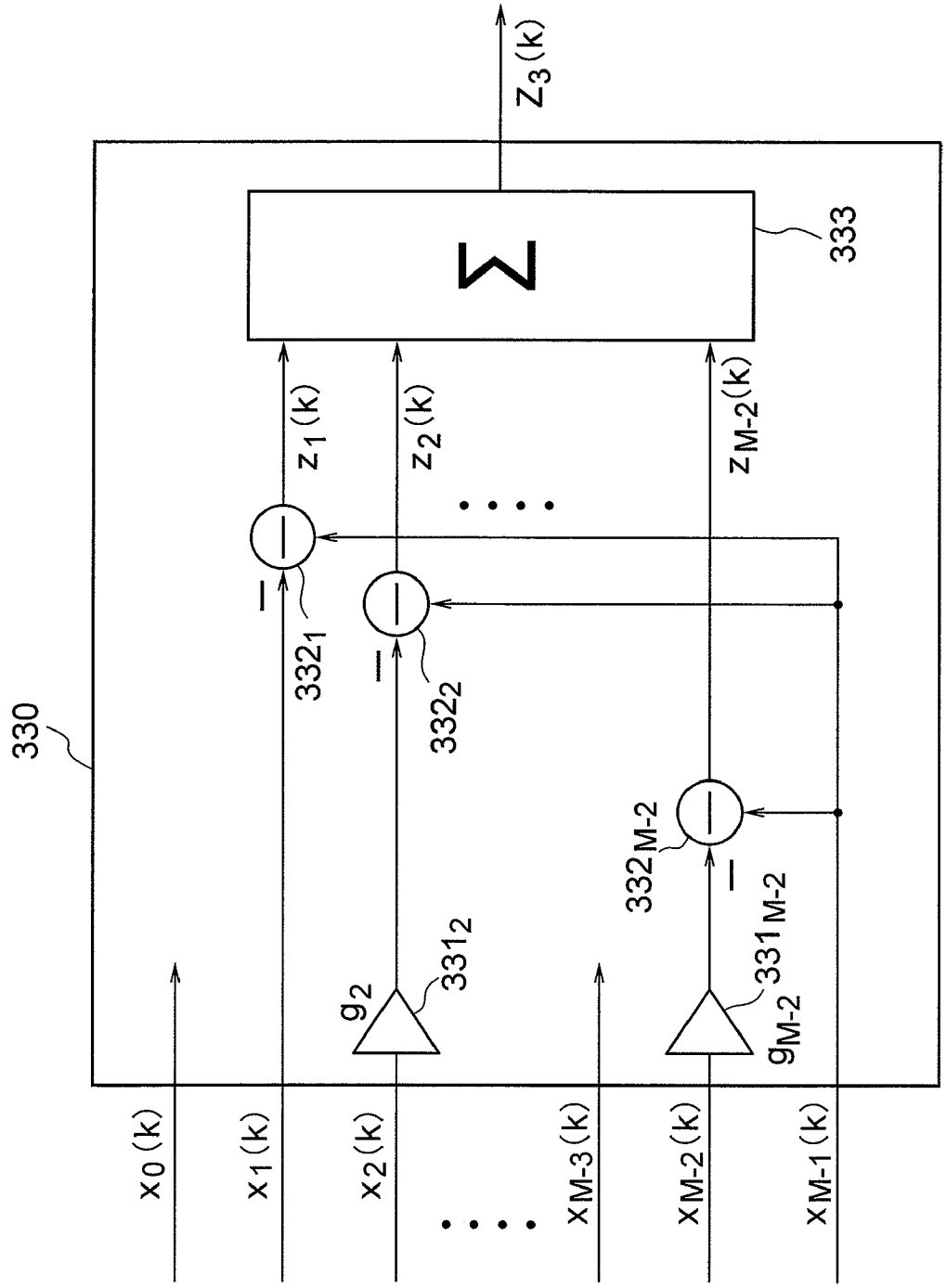
FIG. 9 is a block diagram showing a third exemplary configuration of the leakage blocking matrix circuit 330.
Figure 10:
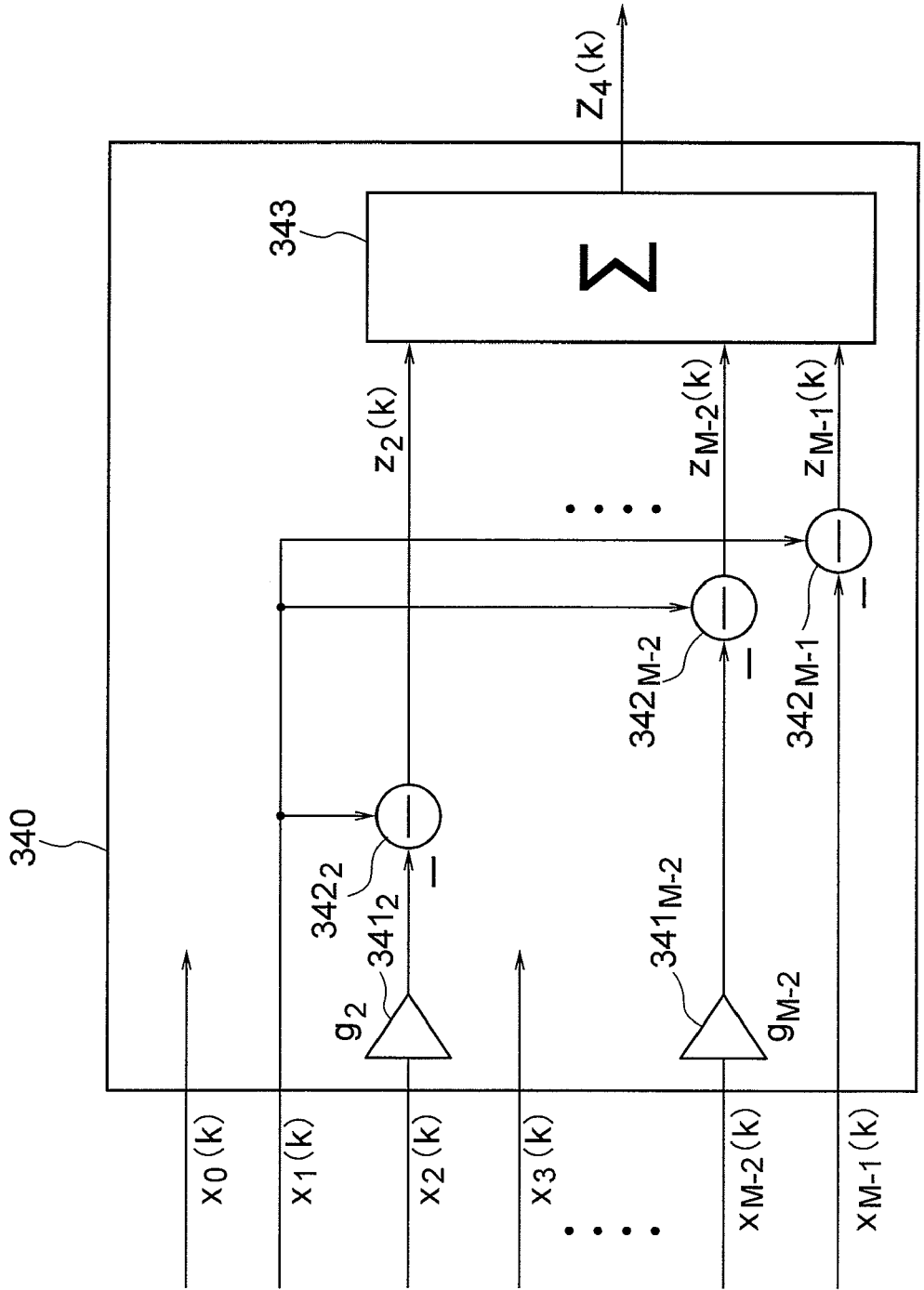
FIG. 10 is a block diagram showing a third exemplary configuration of the leakage blocking matrix circuit 340.
Figure 11:
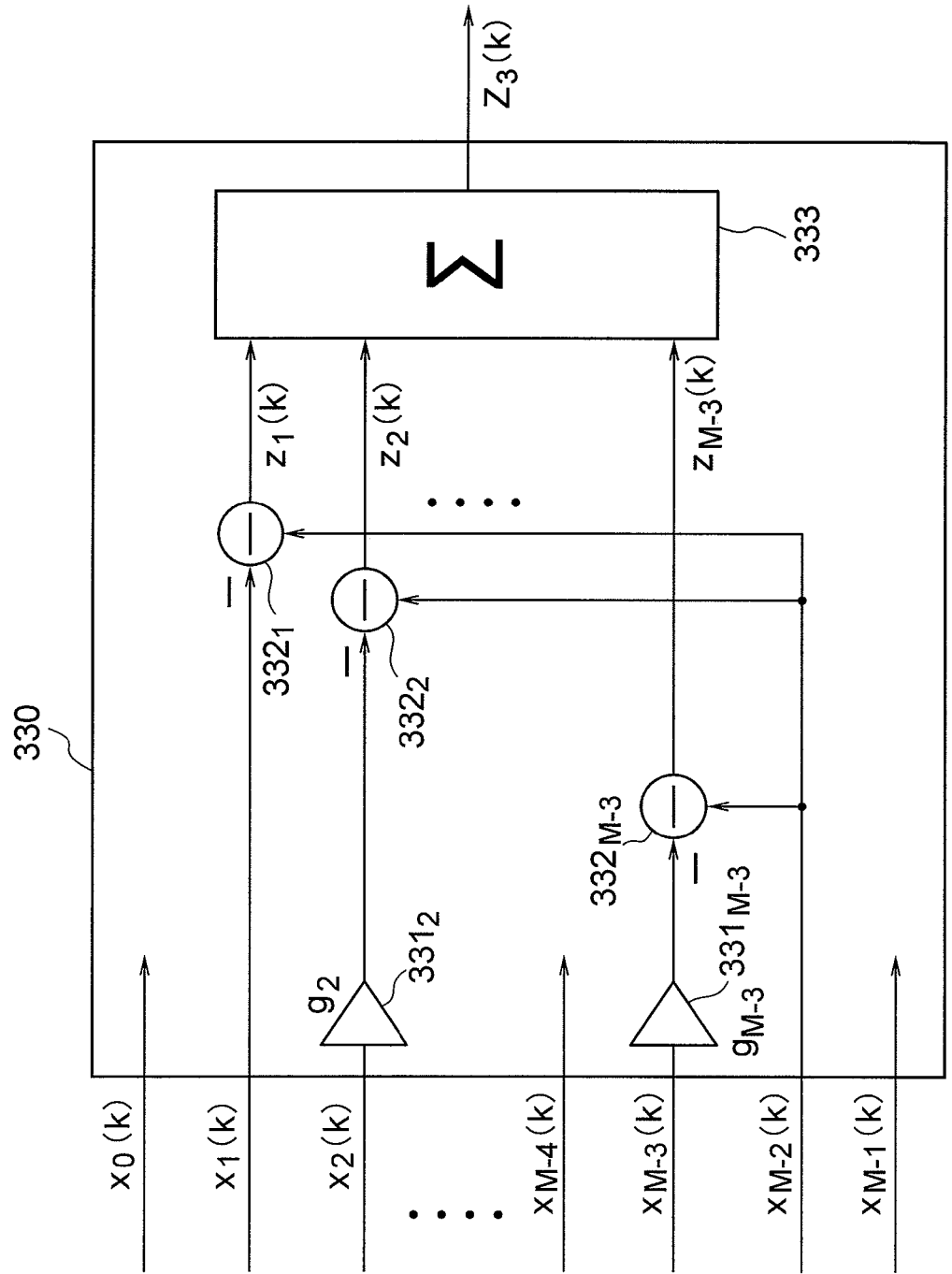
FIG. 11 is a block diagram showing a fourth exemplary configuration of the leakage blocking matrix circuit 330.
Figure 12:
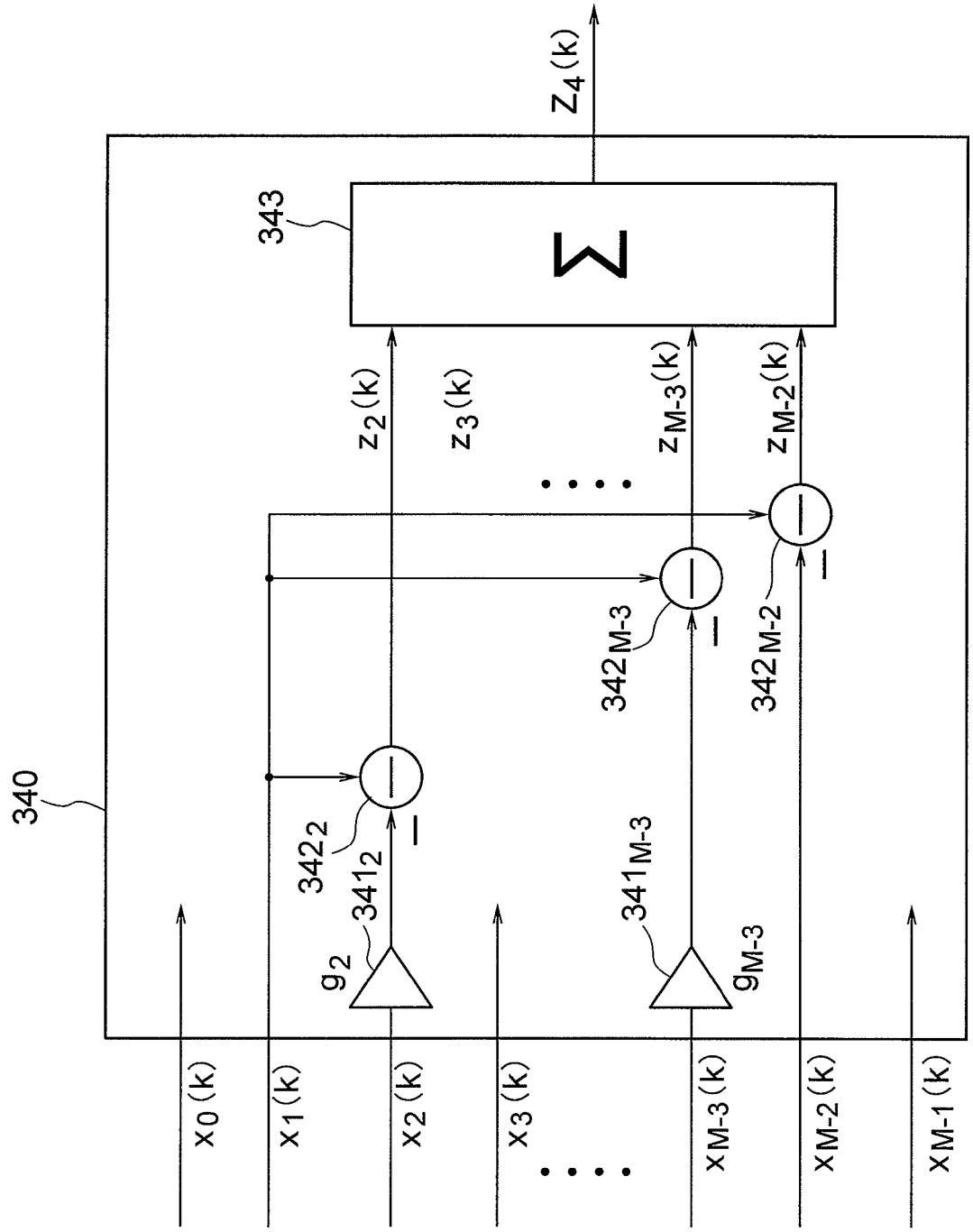
FIG. 12 is a block diagram showing a fourth exemplary configuration of the leakage blocking matrix circuit 340.
Figure 13:
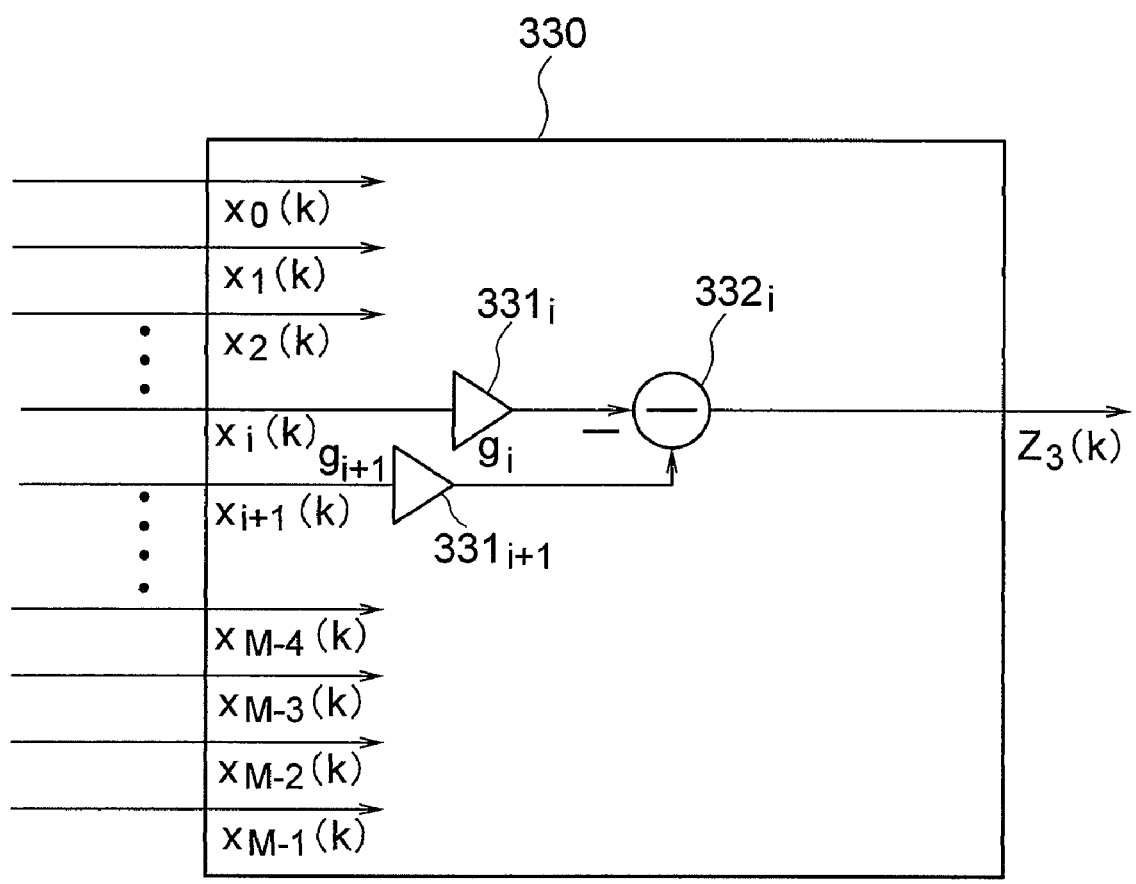
FIG. 13 is a block diagram showing a fifth exemplary configuration of the leakage blocking matrix circuit 330.
Figure 14:
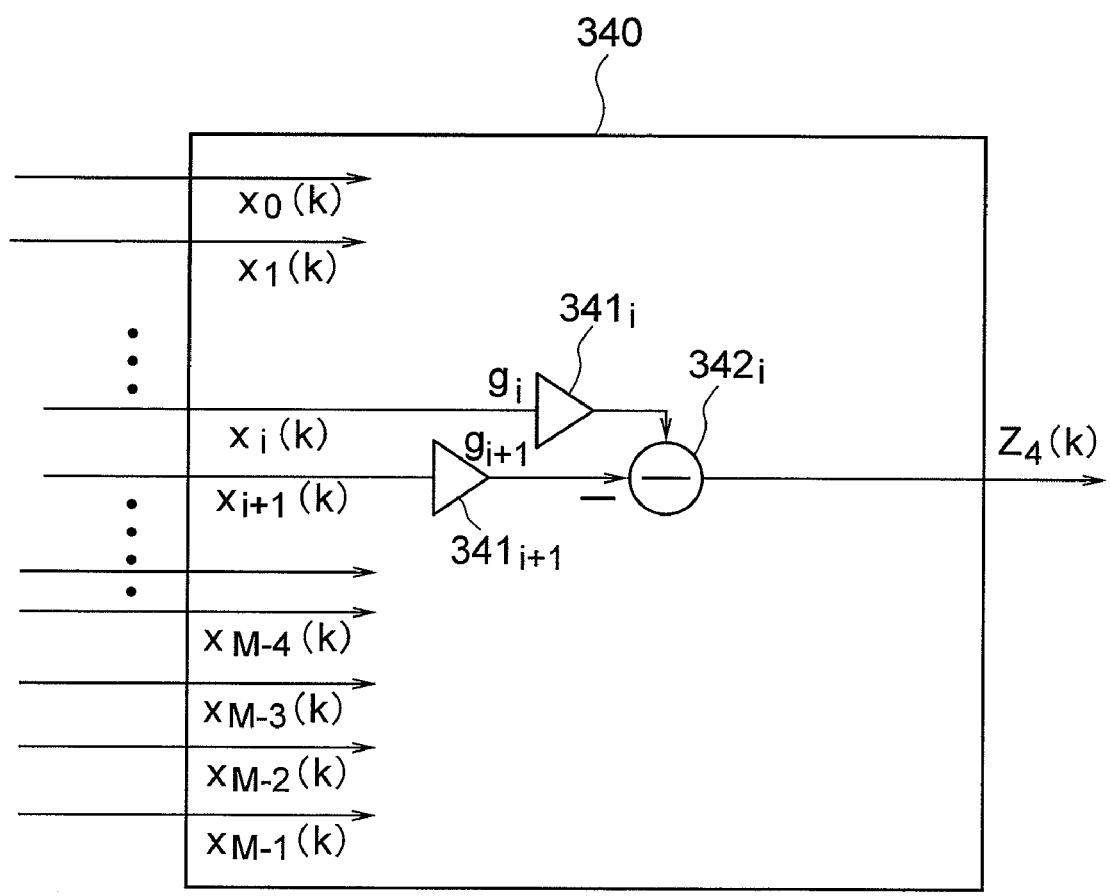
FIG. 14 is a block diagram showing a fifth exemplary configuration of the leakage blocking matrix circuit 340.
Figure 15:
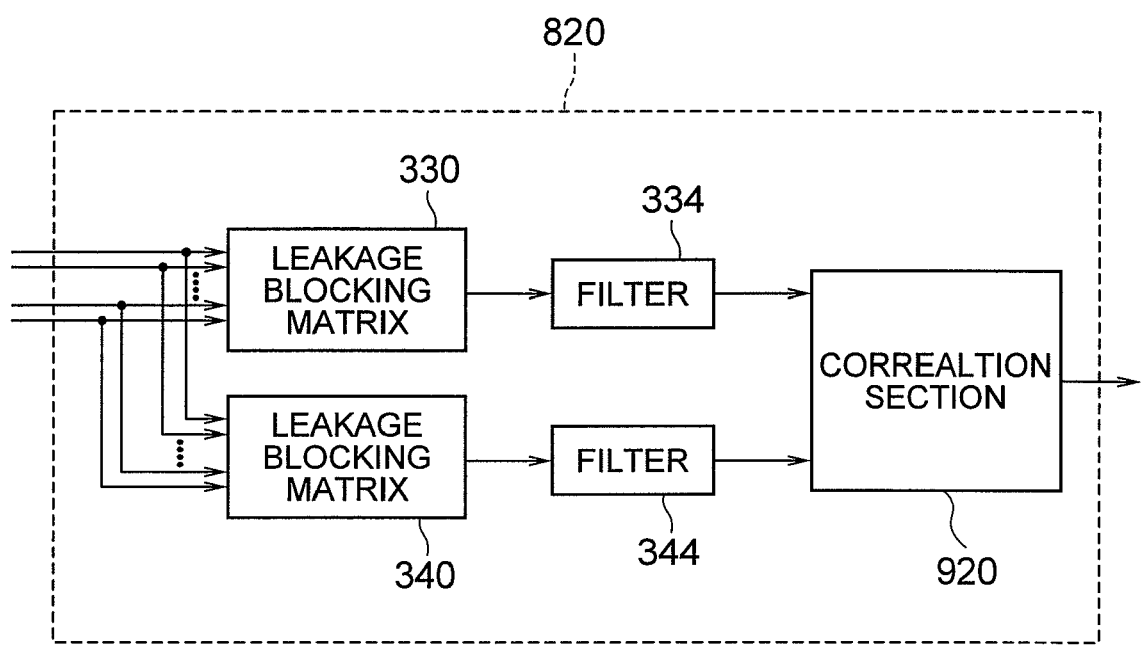
FIG. 15 is a block diagram showing a second exemplary configuration of the identification information generation section 820.
Figure 16:
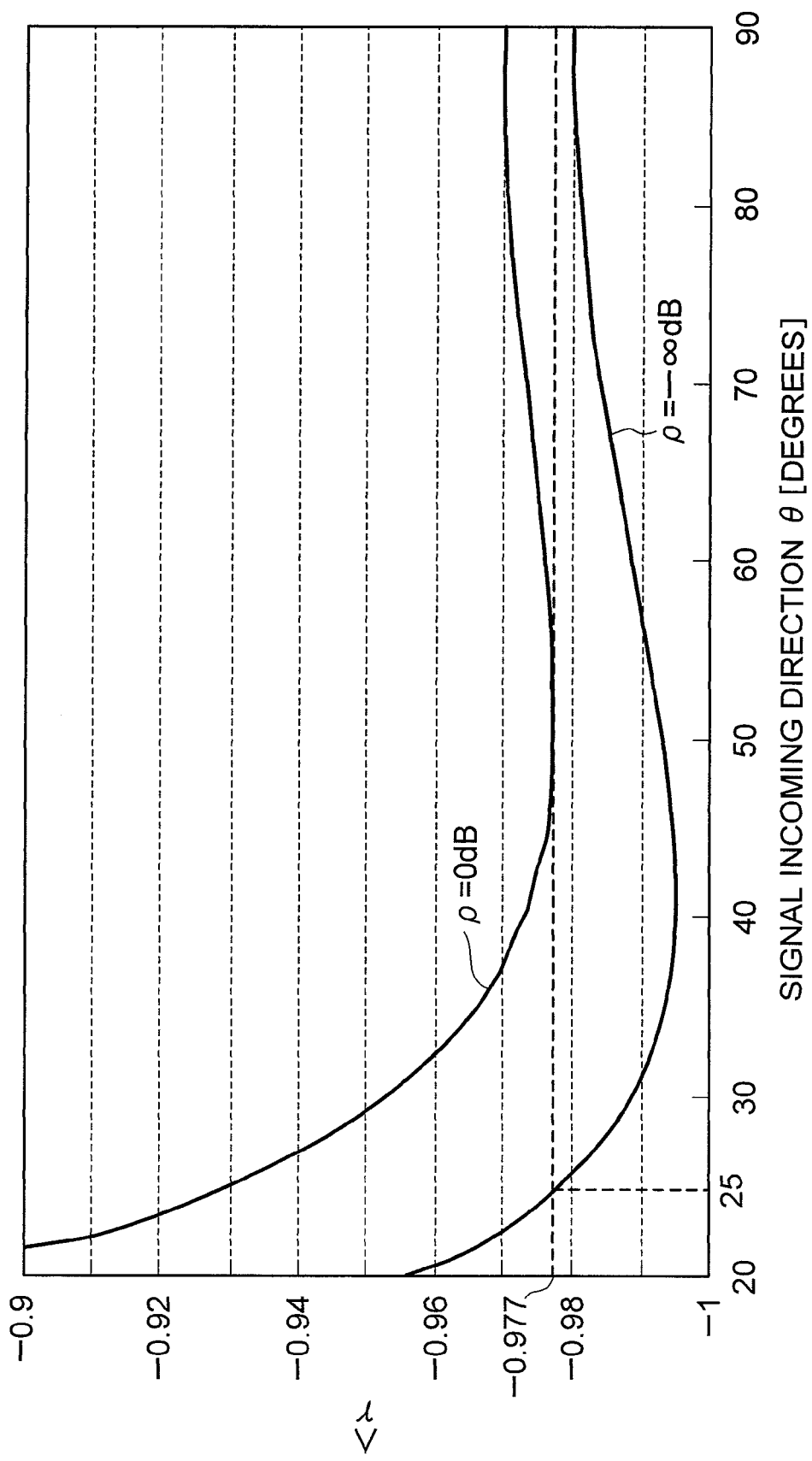
FIG. 16 shows a signal incoming direction and normalized mutual-correlation with respect to a plurality of signal to interference ratio.
Figure 17:
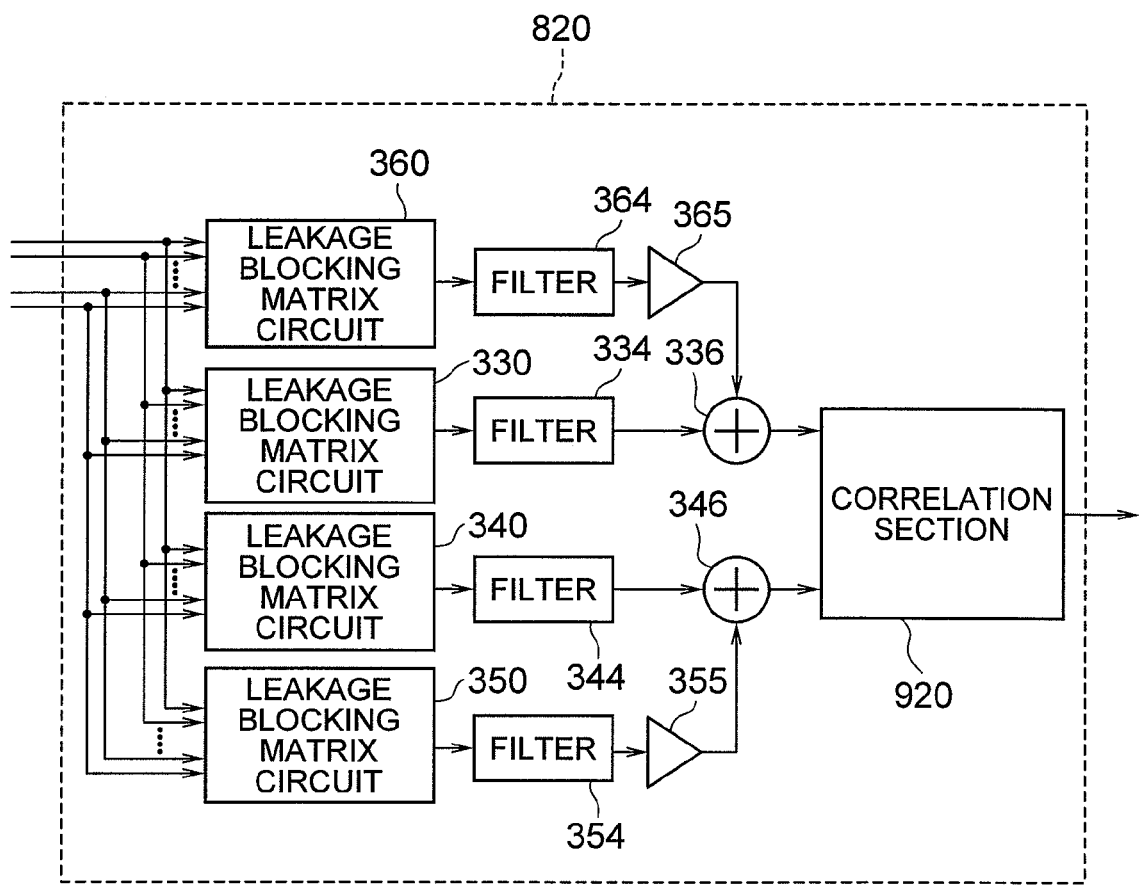
FIG. 17 is a block diagram showing a third exemplary configuration of the identification information generation section 820.
Figure 18:
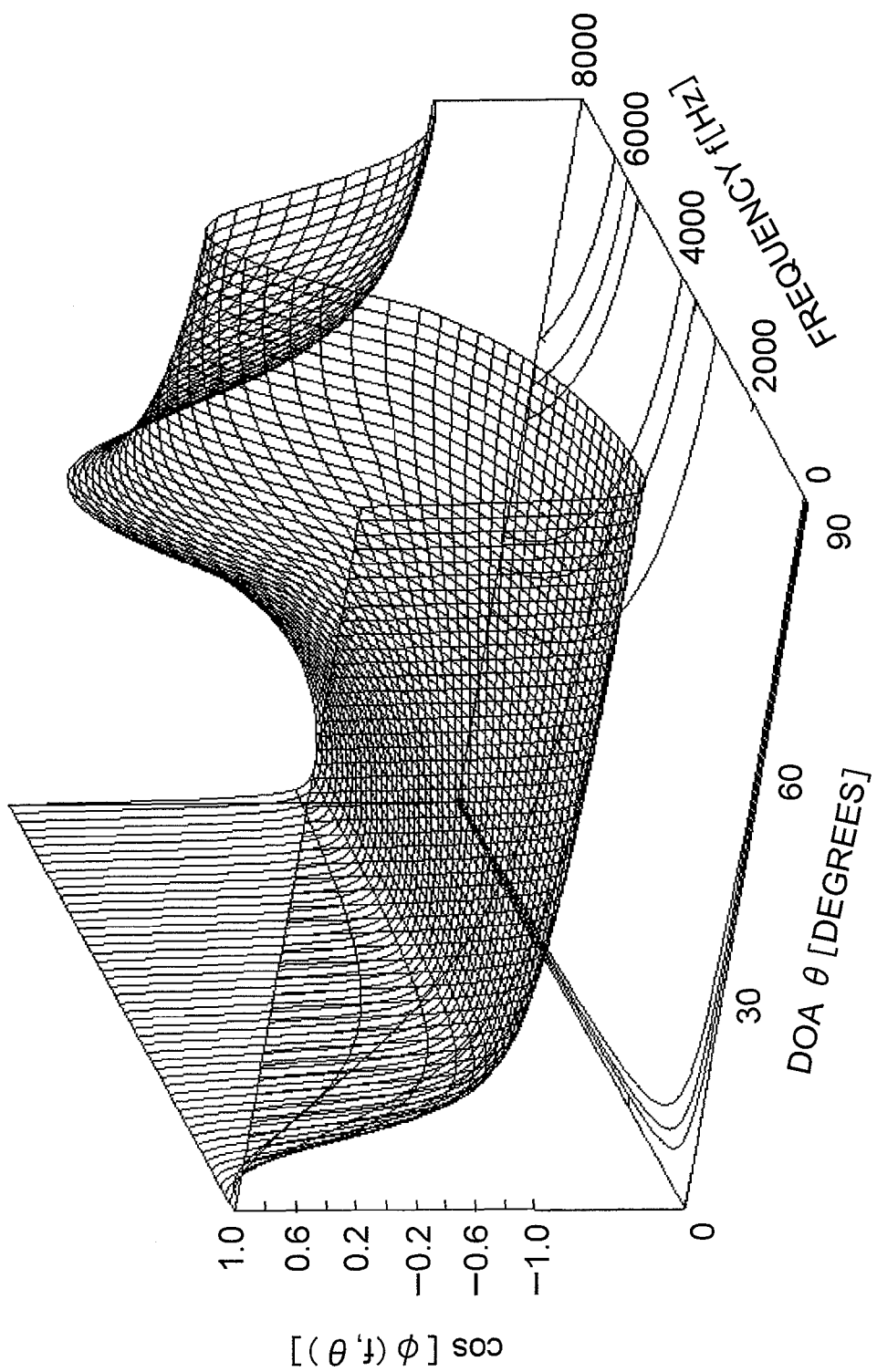
FIG. 18 is a block diagram showing cosine of an output phase difference between the leakage blocking matrix circuits 330 and 340.
Figure 19:
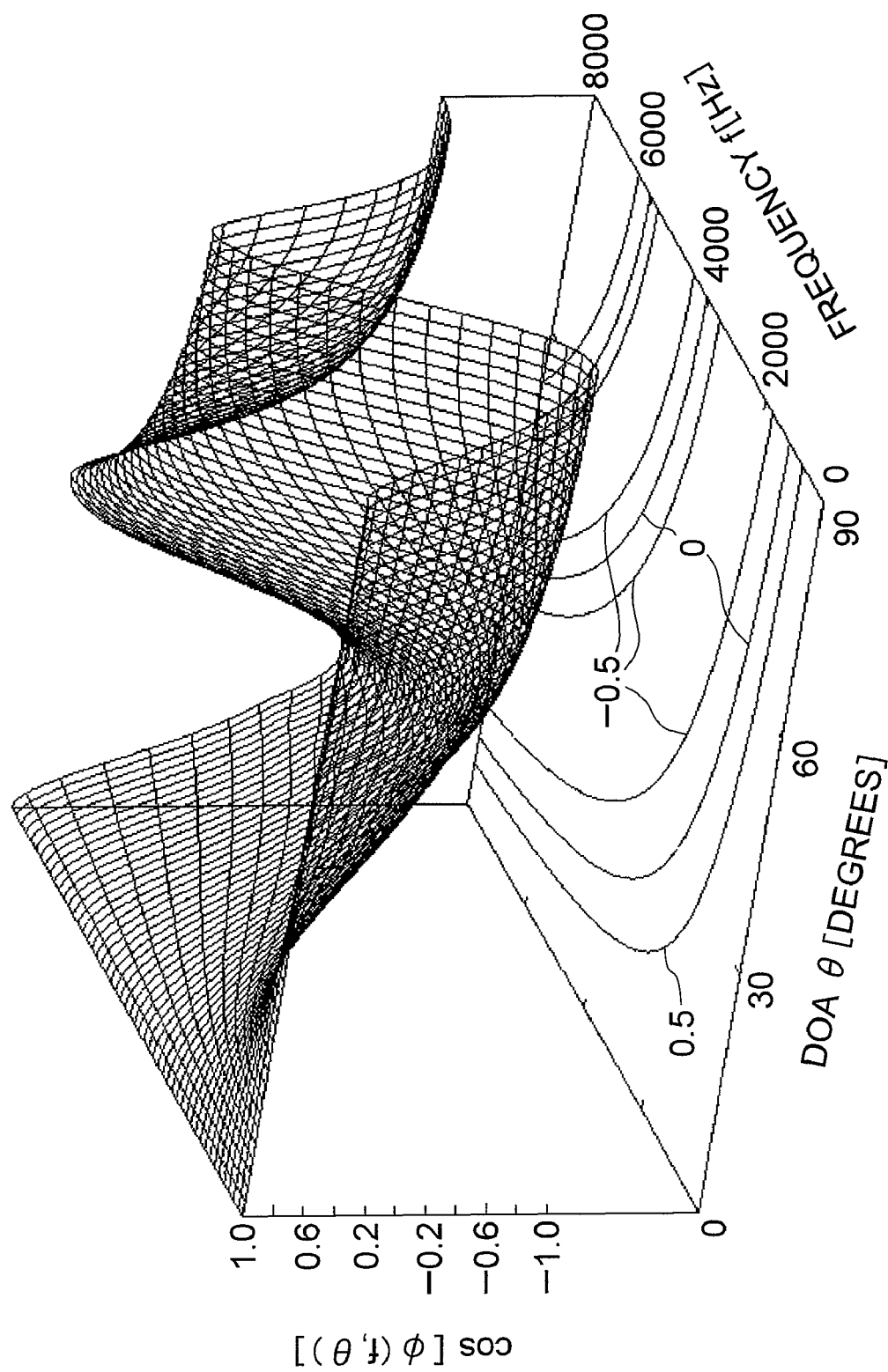
FIG. 19 is a block diagram showing cosine of an output phase difference between the leakage blocking matrix circuits 350 and 360.
Figure 20:
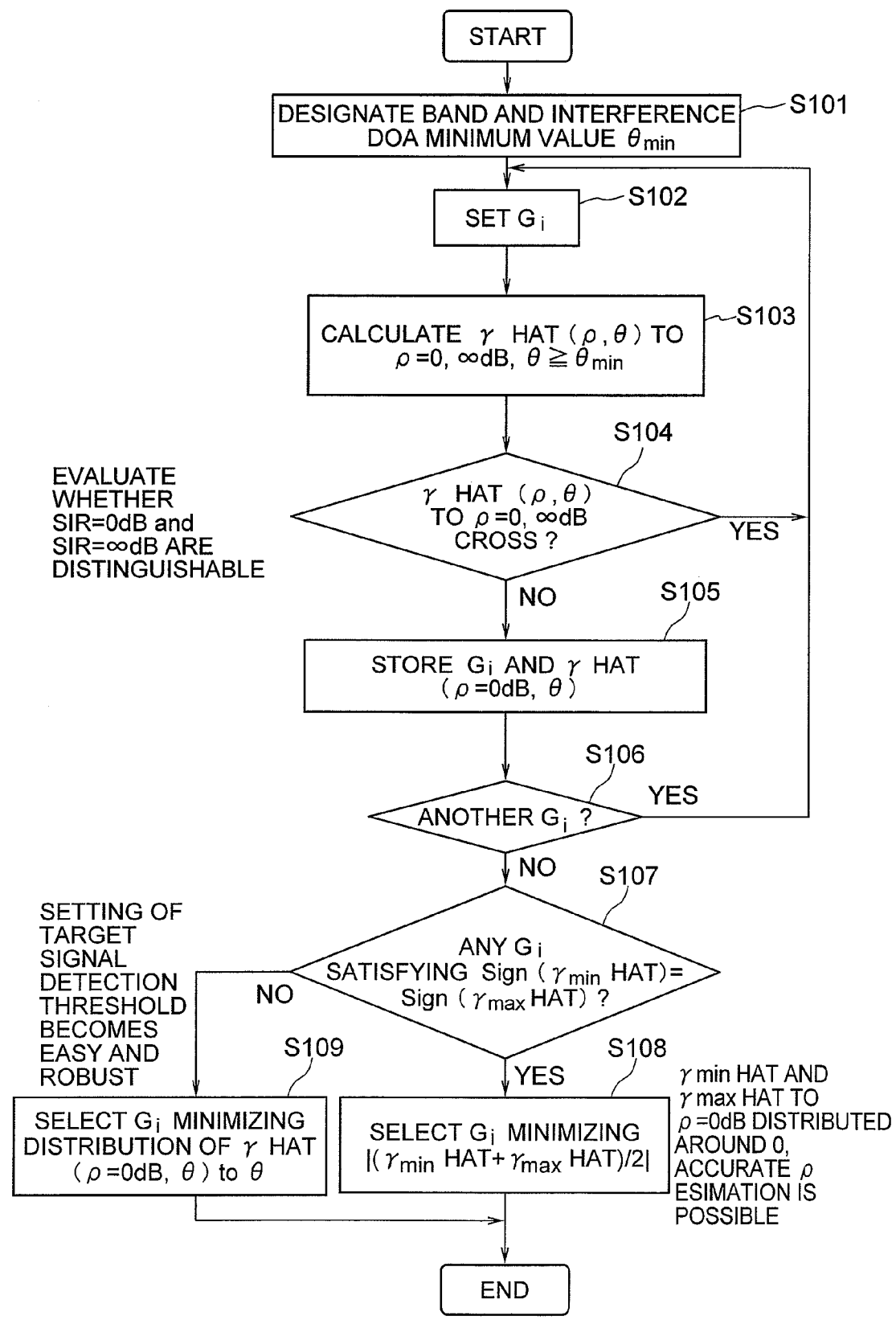
FIG. 20 is a flowchart showing an example of design method of a leakage coefficient.
Figure 21:
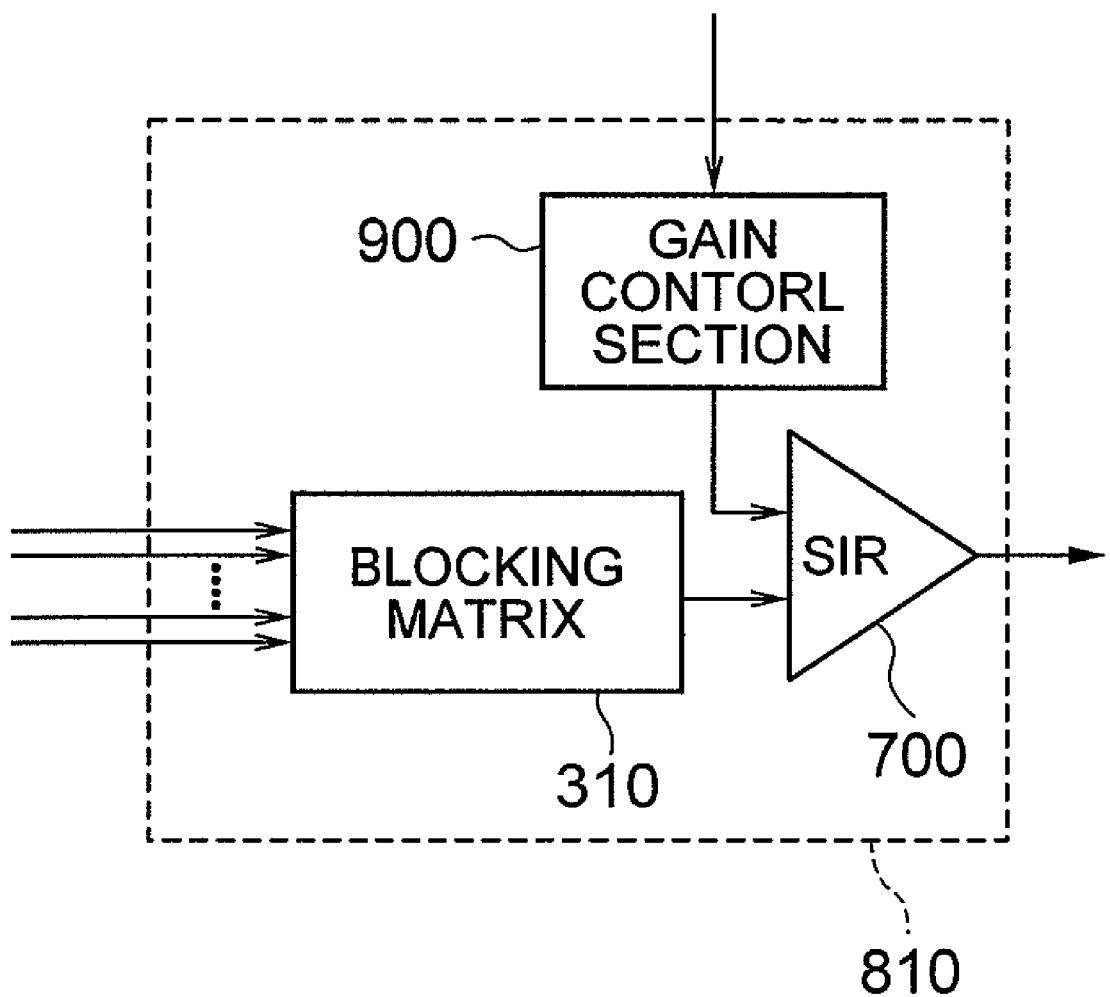
FIG. 21 is a block diagram showing a second exemplary configuration of the identification information generation section 810.
Figure 22:
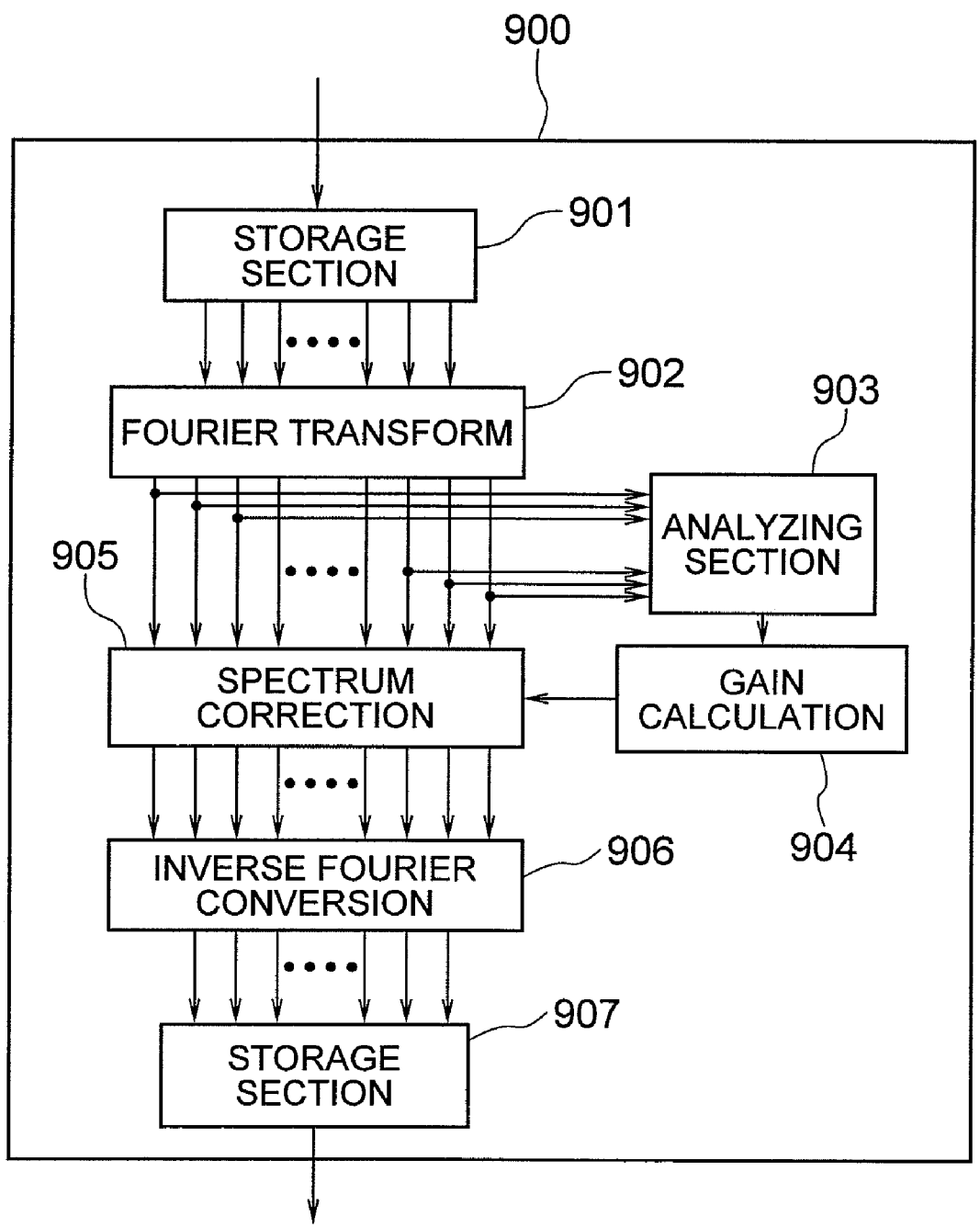
FIG. 22 is a block diagram showing a first exemplary configuration of a gain control circuit 900.
Figure 23:
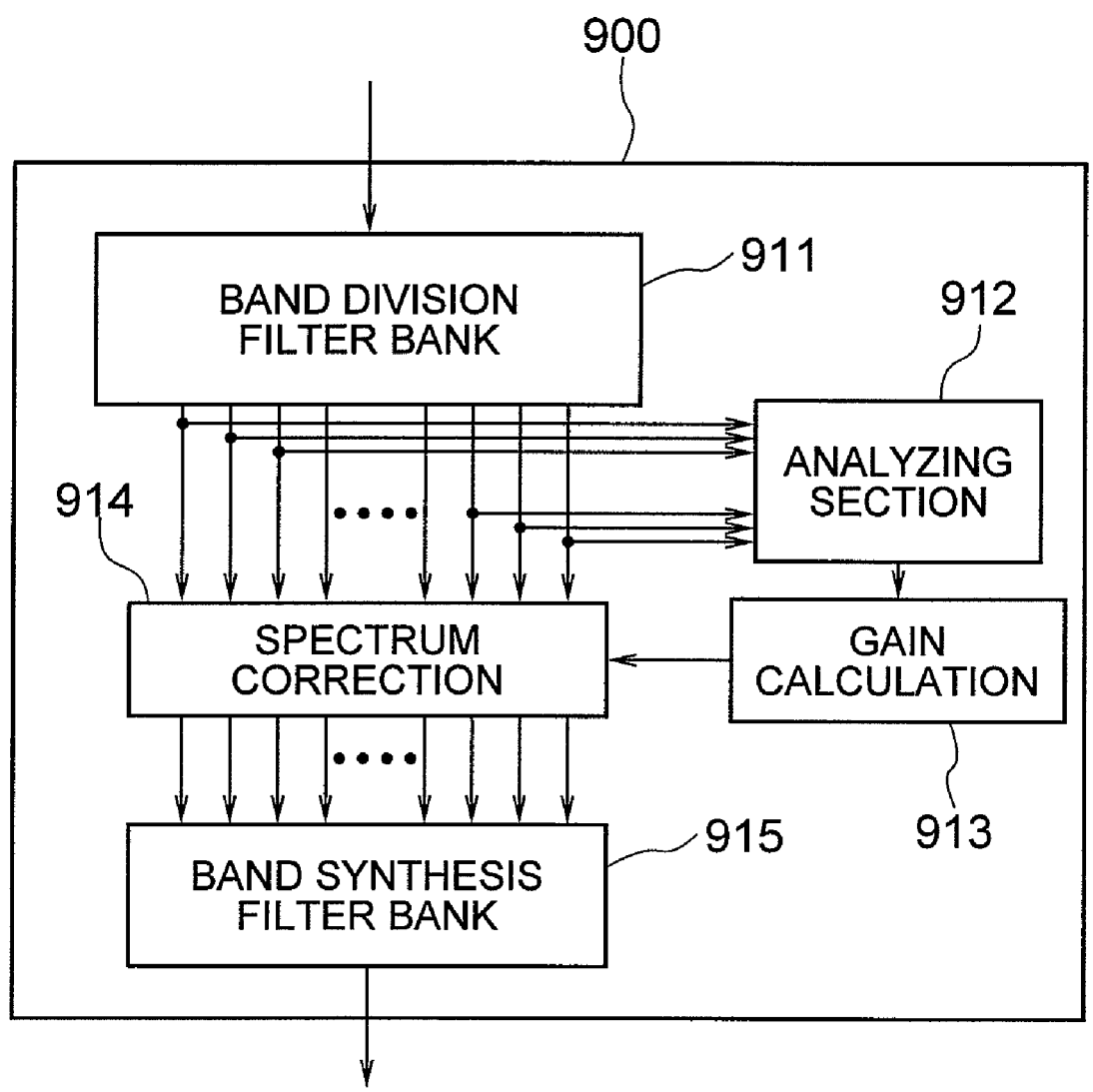
FIG. 23 is a block diagram showing a second exemplary configuration of the gain control circuit 900.
Figure 24:
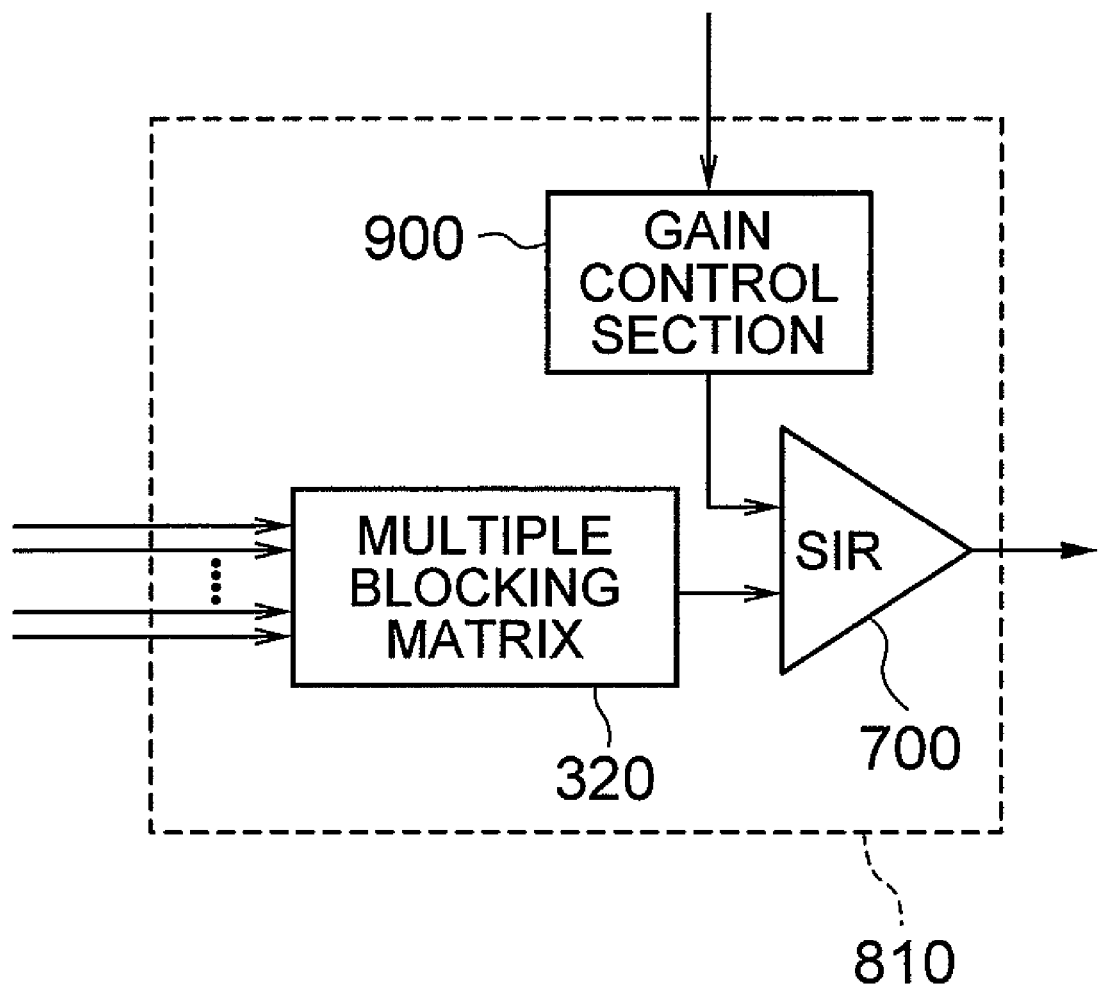
FIG. 24 is a block diagram showing a third exemplary configuration of the identification information generation section 810.
Figure 25:
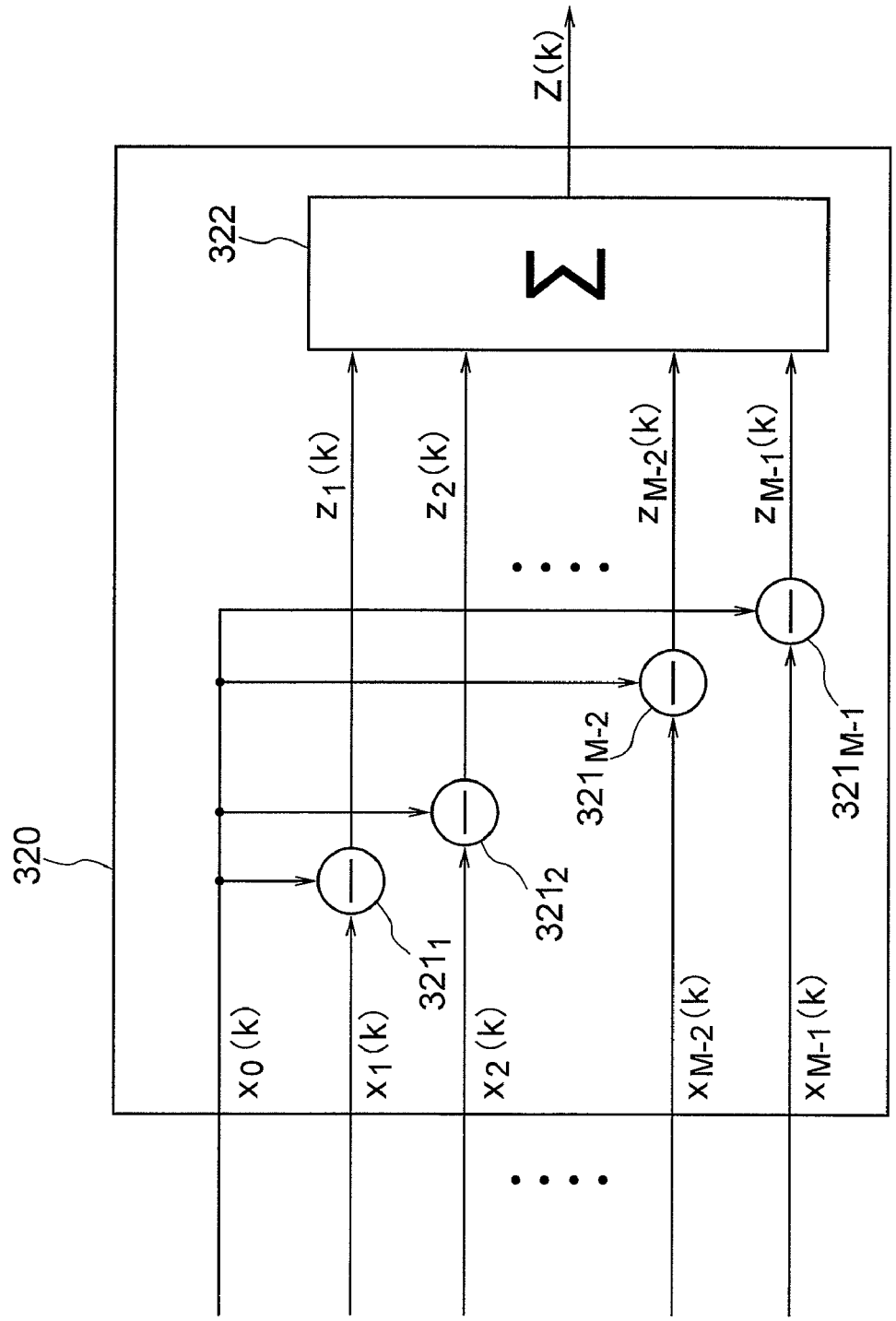
FIG. 25 is a blocking diagram showing a first exemplary configuration of the multiple blocking matrix circuit 320.
Figure 26:
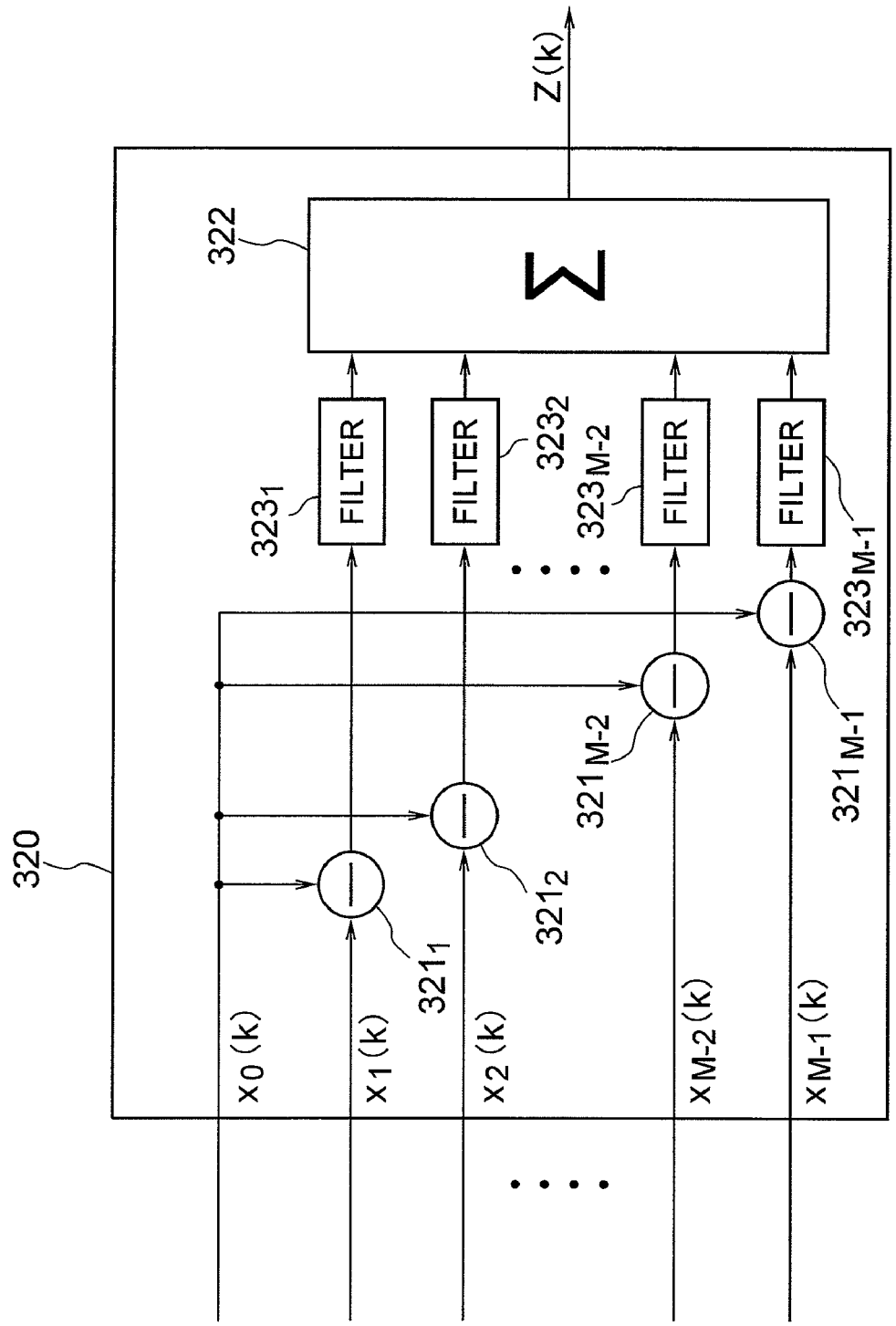
FIG. 26 is a blocking diagram showing a second exemplary configuration of the multiple blocking matrix circuit 320.
Figure 27:
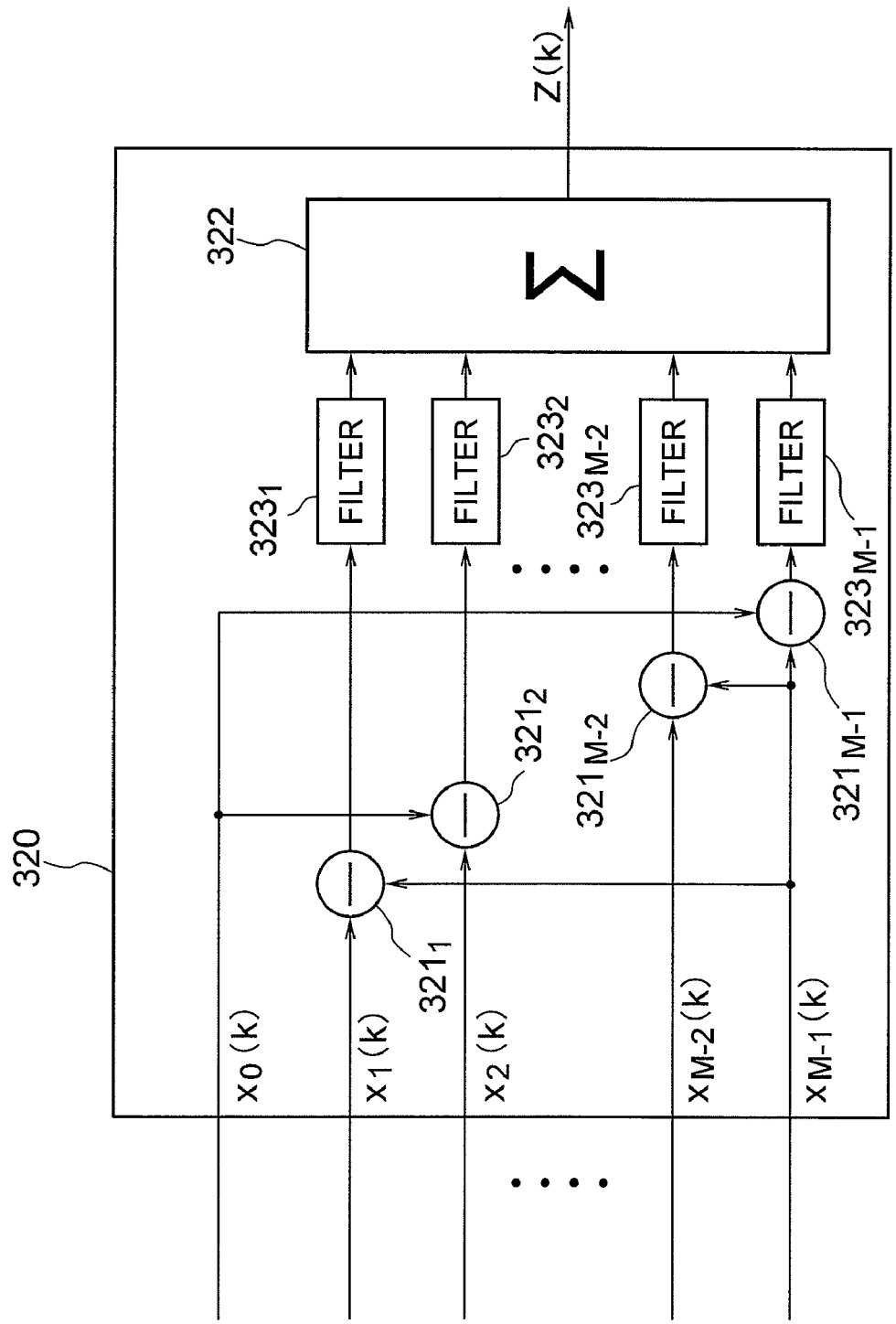
FIG. 27 is a blocking diagram showing a third exemplary configuration of the multiple blocking matrix circuit 320.
Figure 28:
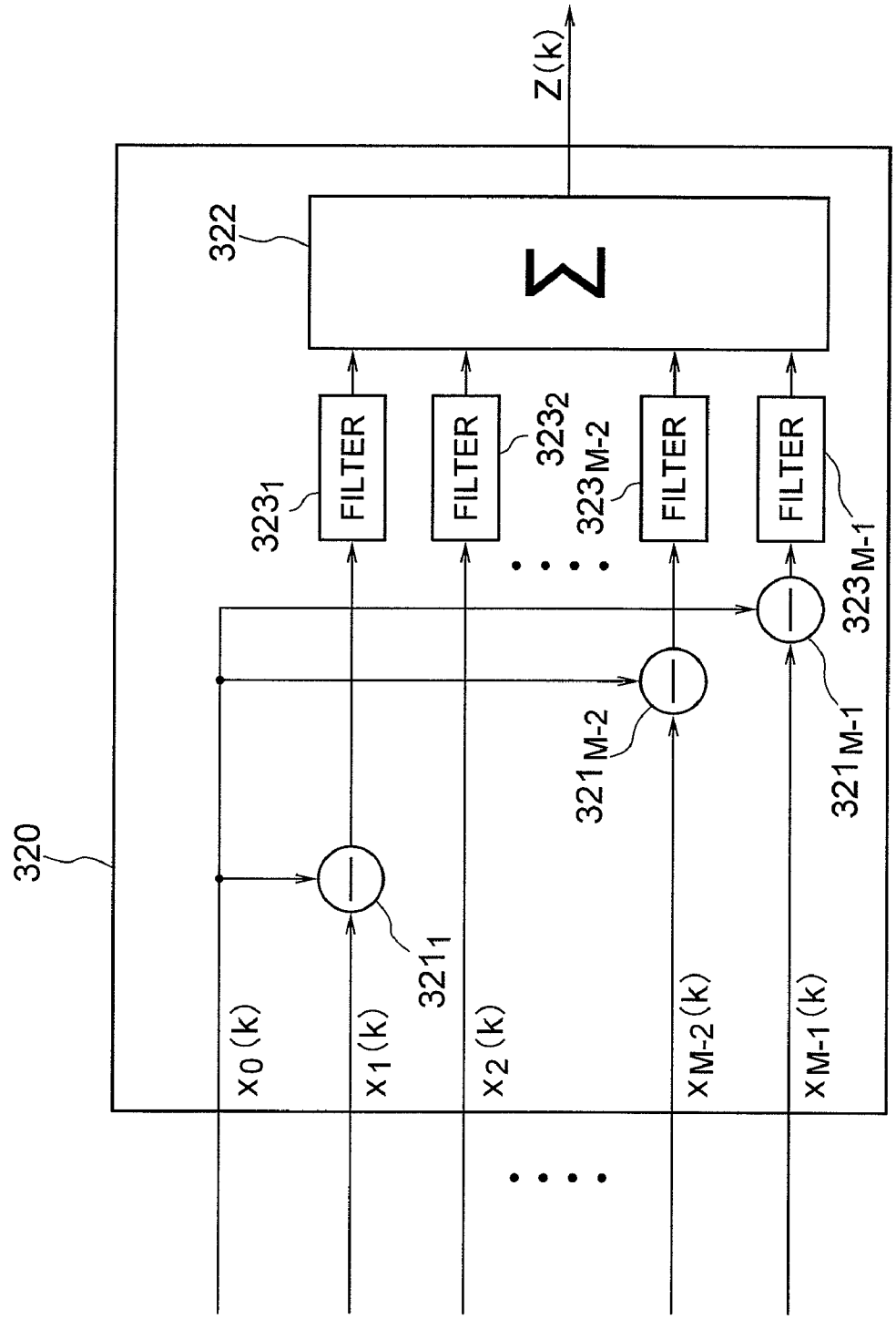
FIG. 28 is a blocking diagram showing a fourth exemplary configuration of the multiple blocking matrix circuit 320.
Figure 29:
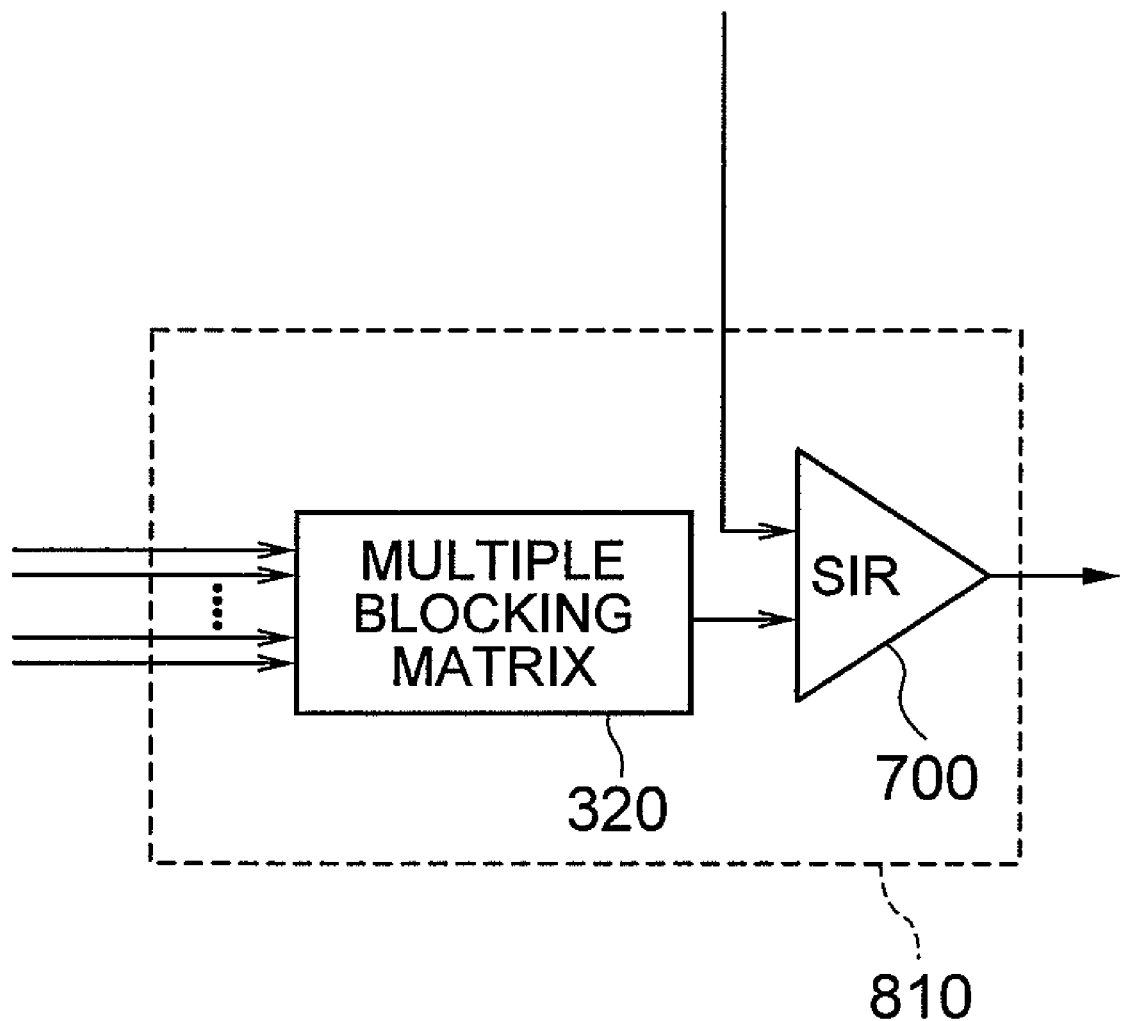
FIG. 29 is a block diagram showing a fourth exemplary configuration of the identification information generation section 810.
Figure 30:
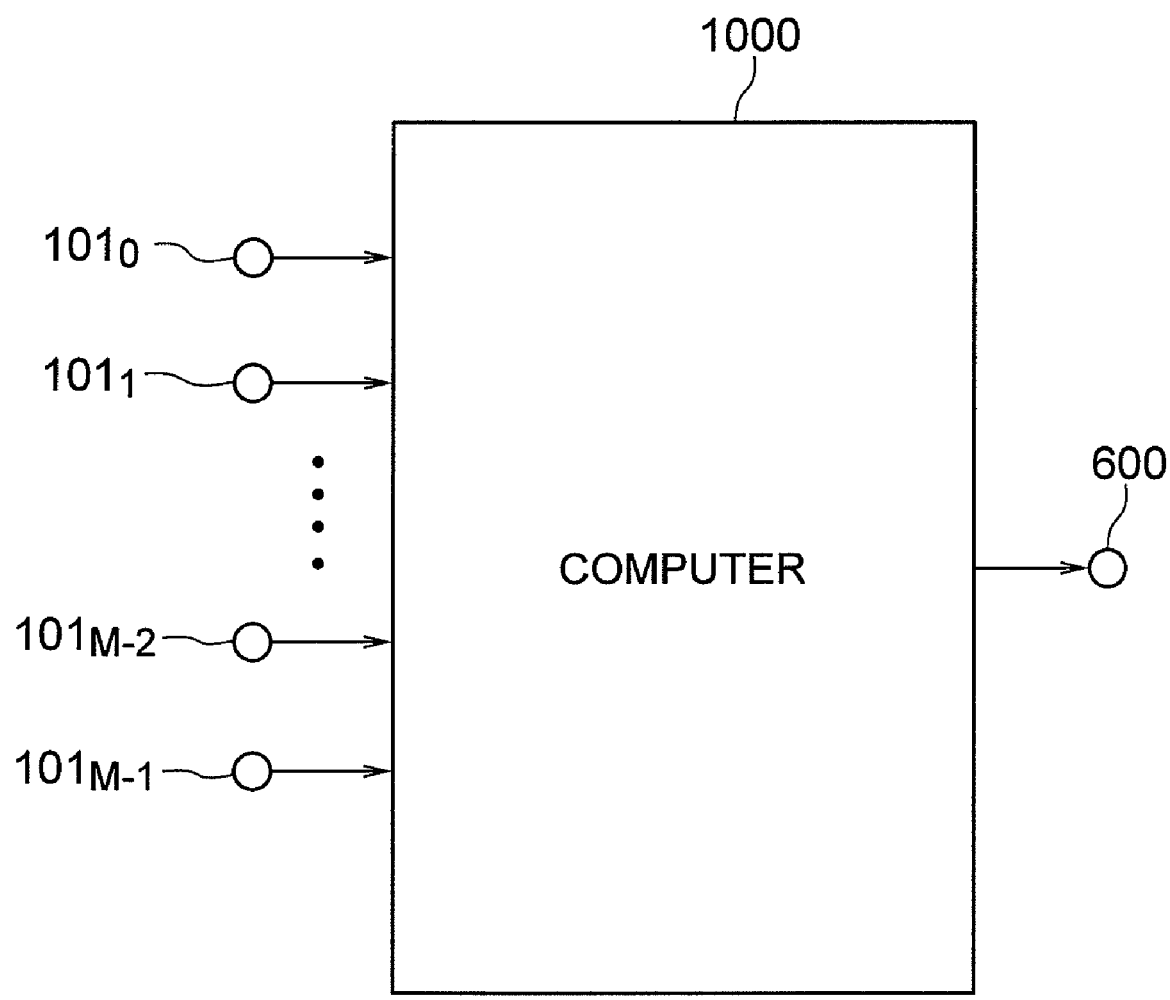
FIG. 30 is a block diagram showing an adaptive array device having an adaptive array control device according to a second exemplary embodiment of the invention.
Figure 31:
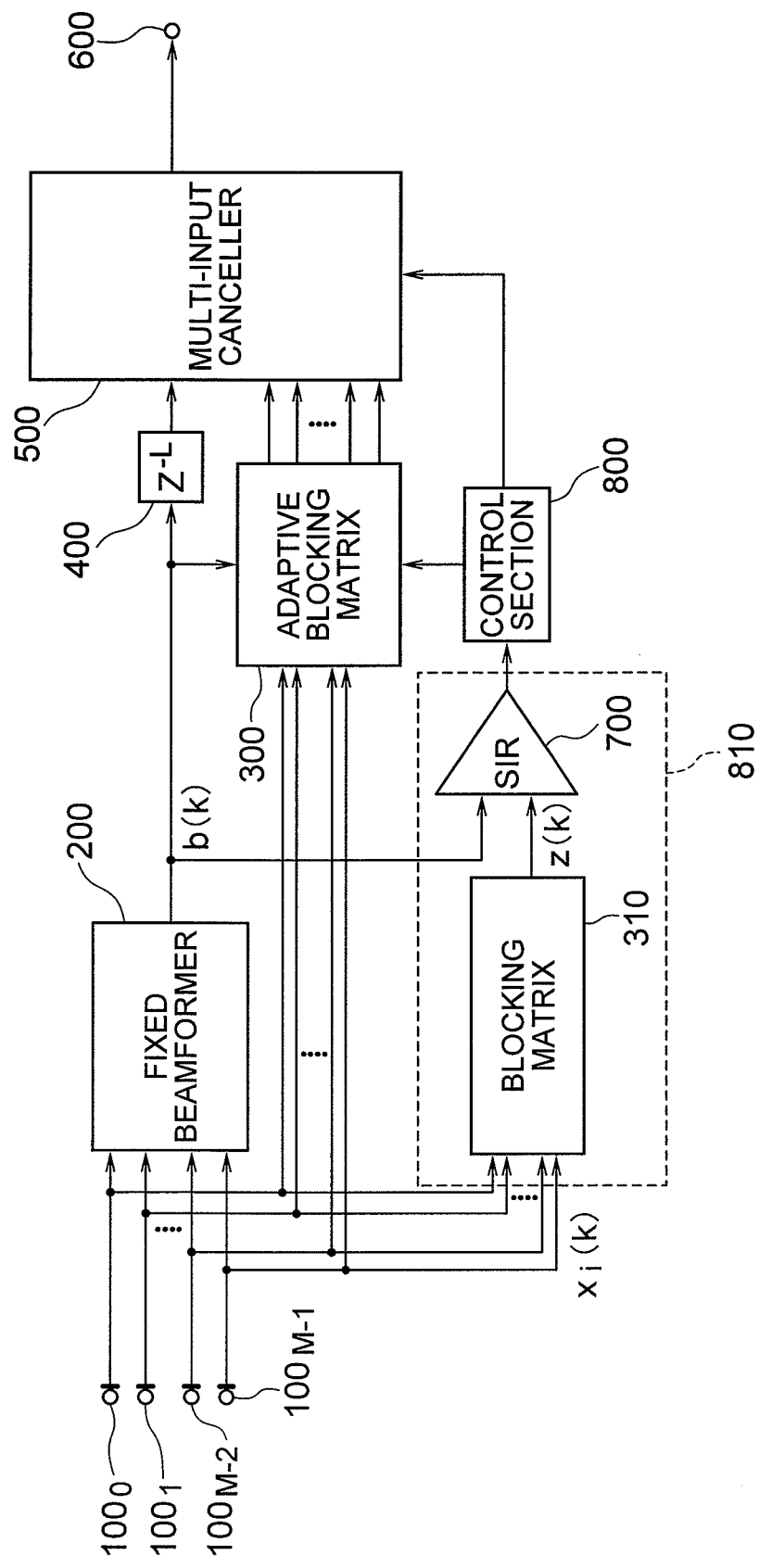
FIG. 31 is a block diagram showing an adaptive array device having an adaptive array control device according to a conventional example.
Figure 32:
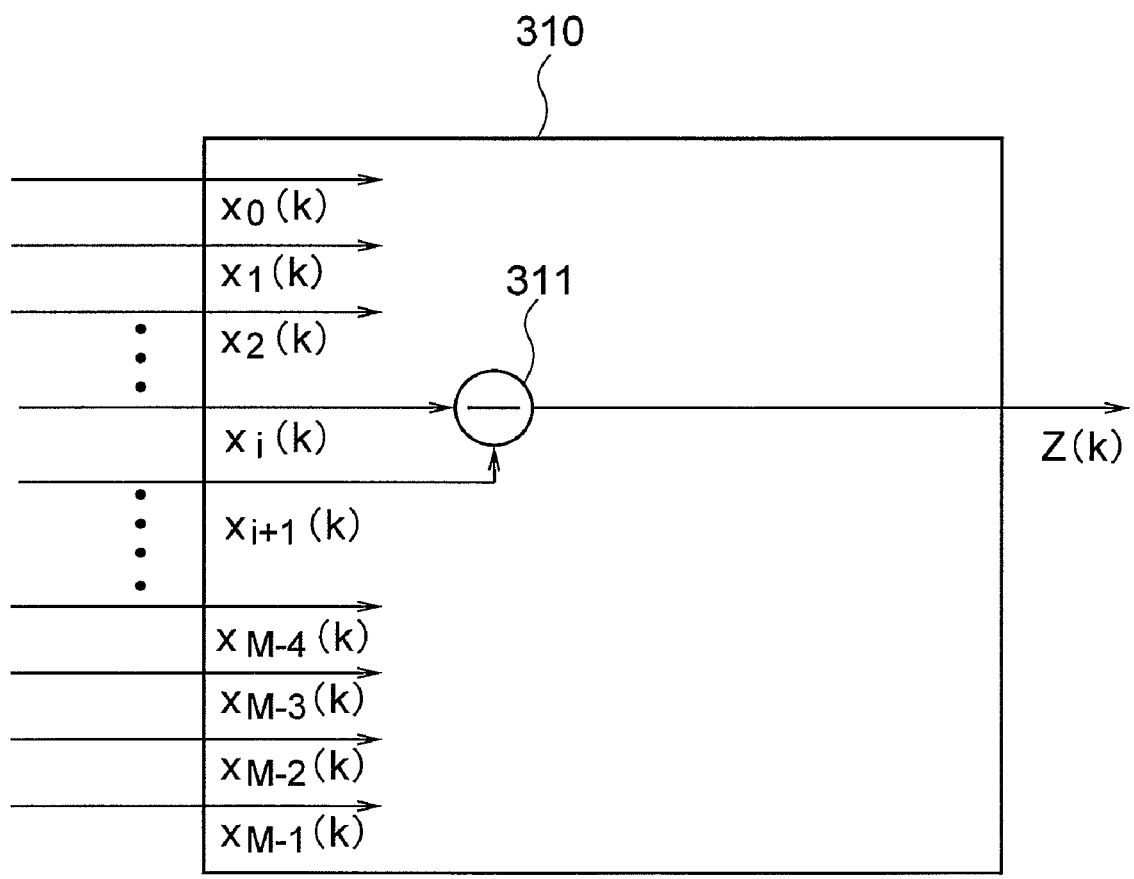
FIG. 32 is a block diagram showing an exemplary configuration of the blocking matrix circuit 310.

| | |
|---|---|
| 311, $321_0$~$321_{M-1}$, $322_0$~$322_{M-2}$, $342_1$~$342_{M-1}$, | subtracter |
| 322, 333, 343, 336, 346 | adder |
| $323_0$~$323_{M-1}$, 334, 344, 354, 364 | filter |
| 330, 340, 350, 360 | leakage blocking matrix circuit |
| $331_1$-$331_{M-2}$, $341_1$-$341_{M-2}$, 355, 365 | multiplier |
| 400 | delay element |
| 500 | multi-input canceller |
| 600 | output terminal |
| 700 | calculation section for target signal to interference ratio (SIR) |
| 800 | control section |
| 810 | second identification information generation section |
| 820 | first identification information generation section |
| 830 | correction signal generation section |
| 840 | correction section |
| 900 | gain control section |
| 901, 907 | storage section |
| 902 | Fourier transform section |
| 903, 912 | analyzing section |
| 904, 913 | gain calculation section |
| 905, 914 | spectrum correction section |
| 906 | inverse Fourier transform section |
| 911 | band division filter bank |
| 915 | band synthesis filter bank |
| 920 | correlation calculation section |
| 1000 | computer |

The invention claimed is:

1. An adaptive array control device comprising:
a first identification information generation section which applies first array processing to signals acquired in a plurality of sensors arranged in an array and calculates a relative ratio between a target signal and interference based on phase information to thereby acquire first identification information;
a correction signal generation section which generates a correction signal, using the first identification information, for performing larger correction when target signal power is higher than interference power;
a second identification information generation section which calculates a relative ratio between the target signal and the interference based on amplitude information to thereby acquire second identification information;
a correction section which corrects the second identification information according to the correction signal to thereby acquire corrected identification information; and
a control section which controls speed and accuracy of parameter adjustment in adaptive array processing using the corrected identification information.

2. The adaptive array control device, according to claim 1, wherein the second identification information generation section applies second array processing to signals acquired in a plurality of sensors arranged in an array and calculates the relative ratio between the target signal and the interference based on the amplitude information to thereby acquire the second identification information.

3. The adaptive array control device, according to claim 2, wherein
the second identification information generation section includes a third array processing section which attenuates the target signal with respect to other signals to thereby acquire a third array-processed signal, and a fourth array processing section which enhances the target signal with respect to other signals to thereby acquire a fourth array-processed signal, and acquires the second identification information based on the third array-processed signal and the fourth array-processed signal.

4. The adaptive array control device, according to claim 3, wherein the second identification information generation section performs array processing on signals acquired from a plurality of pairs of sensors having different sensor intervals, among the plurality of sensors arranged in an array, to thereby attenuate the target signal with respect to other signals and acquire the third array-processed signal.

5. The adaptive array control device, according to claim 3, wherein
the second identification information generation section includes an analyzing section which analyzes the fourth array-processed signal to thereby acquire a signal characteristic, and a correction section which corrects the fourth array-processed signal according to the signal characteristic to thereby acquire a corrected array-processed signal, and acquires the second identification information based on the third array-processed signal and the corrected array-processed signal.

6. The adaptive array control device, according to claim 1, wherein
the first identification information generation section includes a fifth array processing section and a sixth array processing section which perform fifth array processing and sixth array processing in which input signals are equal and a phase difference between output signals is zero with respect to a signal incoming from a direction vertical to the array, and with respect to a signal incoming from another direction, the phase difference takes a value between zero and 180 degrees corresponding to the direction, to thereby acquire a fifth array-processed signal and a sixth array-processed signal, and acquires the first identification information using the fifth array-processed signal and the sixth array-processed signal.

7. The adaptive array control device, according to claim 6, wherein the fifth array processing section and the sixth array processing section are characterized in that a gain with respect to the target signal is non-zero.

8. The adaptive array control device, according to claim 6, wherein the first identification information generation section generates the control signal using correlation between the fifth array-processed signal and the sixth array-processed signal.

9. The adaptive array control device, according to claim 6, wherein
the first identification information generation section filters the fifth array-processed signal and the sixth array-processed signal to thereby acquire a fifth filter-processed signal and a sixth filter-processed signal, and acquires the first identification information using the fifth filter-processed signal and the sixth filter-processed signal.

10. The adaptive array control device, according to claim 6, wherein
the fifth array processing section and the sixth array processing section perform array-processing on signals acquired from a plurality of pairs of sensors having different sensor intervals, among the plurality of sensors arranged in an array, to thereby acquire a fifth array-processed signal and a sixth array-processed signal.

11. An adaptive array control device comprising:
first identification information generation means for applying first array processing to signals acquired in a plurality of sensors arranged in an array and calculates a relative ratio between a target signal and interference based on phase information to thereby acquire first identification information;
correction signal generation means for generating a correction signal, using the first identification information, for performing larger correction when target signal power is higher than interference power;
second identification information generation means for calculating a relative ratio between the target signal and the interference based on amplitude information to thereby acquire second identification information;
correction means for correcting the second identification information according to the correction signal to thereby acquire corrected identification information; and
control means for controlling speed and accuracy of parameter adjustment in adaptive array processing using the corrected identification information.

12. An adaptive array controlling method comprising:
applying first array processing to signals acquired in a plurality of sensors arranged in an array and calculating a relative ratio between a target signal and interference on phase information to thereby acquire first identification information;
generating a correction signal, using the first identification information, for performing larger correction when target signal power is higher than interference power;
calculating a relative ratio between the target signal and the interference based on amplitude information to thereby acquire second identification information;
correcting the second identification information according to the correction signal to thereby acquire corrected identification information; and
controlling speed and accuracy of parameter adjustment in adaptive array processing using the corrected identification information.

13. The adaptive array controlling method, according to claim 12, wherein the second identification information is acquired by applying second array processing to signals acquired in a plurality of sensors arranged in an array and calculating the relative ratio between the target signal and the interference based on the amplitude information.

14. The adaptive array controlling method, according to claim 13, wherein the second array processing includes attenuating the target signal with respect to other signals to thereby acquire a third array-processed signal, and enhancing the target signal with respect to other signals to thereby acquire a fourth array-processed signal, and acquiring the second identification information based on the third array-processed signal and the fourth array-processed signal.

15. The adaptive array controlling method, according to claim 14, wherein
the second array processing includes performing array processing on signals acquired from a plurality of pairs of sensors having different sensor intervals, among a plurality of sensors arranged in an array, to thereby attenuate the target signal with respect to other signals and acquire a third array-processed signal.

16. The adaptive array controlling method, according to claim 14, wherein the second array processing includes analyzing the fourth array-processed signal to thereby acquire a signal characteristic, and correcting the fourth array-processed signal according to the signal characteristic to thereby acquire a corrected array-processed signal, and acquiring the second identification information based on the corrected array-processed signal and the fourth array-processed signal.

17. The adaptive array controlling method, according to claim 12, wherein the first array processing includes performing fifth array processing and sixth array processing in which input signals are equal and a phase difference between output signals is zero with respect to a signal incoming from a direction vertical to the array, and with respect to a signal incoming from another direction, the phase difference takes a value between zero and 180 degrees corresponding to the direction, to thereby acquire a fifth array-processed signal and a sixth array-processed signal, and acquiring the first identification information using the fifth array-processed signal and the sixth array-processed signal.

18. The adaptive array controlling method, according to claim 17, wherein the fifth array processing and the sixth array processing are characterized in that a gain with respect to the target signal is non-zero.

19. The adaptive array controlling method, according to claim 17, wherein the first array processing includes generating the control signal using correlation between the fifth array-processed signal and the sixth array-processed signal.

20. The adaptive array controlling method, according to claim 17, wherein the first array processing includes filtering the fifth array-processed signal and the sixth array-processed signal to thereby acquire a fifth filter-processed signal and a sixth filter-processed signal, and acquiring the first identification information using the fifth filter-processed signal and the sixth filter-processed signal.

21. The adaptive array controlling method, according to claim 17, wherein the fifth array processing and the sixth array processing include performing array-processing on signals acquired from a plurality of pairs of sensors having different sensor intervals, among the plurality of sensors arranged in an array, to thereby acquire a fifth array-processed signal and a sixth array-processed signal.

22. A computer readable medium storing an adaptive array controlling program causing a computer to perform functions of:

applying first array processing to signals acquired in a plurality of sensors arranged in an array and calculating a relative ratio between a target signal and interference based on phase information to thereby acquire first identification information;

generating a correction signal, using the first identification information, for performing larger correction when target signal power is higher than interference power;

calculating a relative ratio between the target signal and the interference based on amplitude information to thereby acquire second identification information;

correcting the second identification information according to the correction signal to thereby acquire corrected identification information; and controlling speed and accuracy of parameter adjustment in adaptive array processing using the corrected identification information.

23. An adaptive array processing device comprising:

a sixth array processing section which enhances a target signal with respect to other signals to thereby acquire a sixth array-processed signal;

a seventh array processing section which attenuates the target signal with respect to other signals to thereby acquire a seventh array-processed signal;

a correlation elimination section which eliminates a signal component correlated to the seventh array-processed signal from the sixth array-processed signal and outputs the sixth array-processed signal;

a first identification information generation section which applies first array processing to signals acquired in a plurality of sensors arranged in an array and calculates a relative ratio between the target signal and interference based on phase information to thereby acquire first identification information;

a correction signal generation section which generates a correction signal, using the first identification information, for performing larger correction when target signal power is higher than interference power;

a second identification information generation section which calculates a relative ratio between the target signal and the interference based on amplitude information to thereby acquire second identification information;

a correction section which corrects the second identification information according to the correction signal to thereby acquire corrected identification information; and a control section which controls speed and accuracy of parameter adjustment in adaptive array processing using the corrected identification information.

24. The adaptive array processing device, according to claim 23, wherein the second identification information generation section applies second array processing to signals acquired in a plurality of sensors arranged in an array and calculates the relative ratio between the target signal and the interference based on the amplitude information to thereby acquire the second identification information.

25. The adaptive array processing device, according to claim 24, wherein the second identification information generation section includes a third array processing section which attenuates the target signal with respect to other signals to thereby acquire a third array-processed signal, and a fourth array processing section which enhances the target signal with respect to other signals to thereby acquire a fourth array-processed signal, and acquires the second identification information based on the third array-processed signal and the fourth array-processed signal.

26. The adaptive array processing device, according to claim 25, wherein the second identification information generation section performs array processing on signals acquired from a plurality of pairs of sensors having different sensor intervals, among the plurality of sensors arranged in an array, to thereby attenuate the target signal with respect to other signals and acquire the third array-processed signal.

27. The adaptive array control device, according to claim 25, wherein the second identification information generation section includes an analyzing section which analyzes the fourth array-processed signal to thereby acquire a signal characteristic, and a correction section which corrects the fourth array-processed signal according to the signal characteristic to thereby acquire a corrected array-processed signal, and acquires the second identification information based on the third array-processed signal and the corrected array-processed signal.

28. The adaptive array processing device, according to claim 23, wherein
the first identification information generation section includes a fifth array processing section and a sixth array processing section which perform fifth array processing and sixth array processing in which input signals are equal and a phase difference between output signals is zero with respect to a signal incoming from a direction vertical to the array, and with respect to a signal incoming from another direction, the phase difference takes a value between zero and 1 corresponding to the direction, to thereby acquire a fifth array-processed signal and a sixth array-processed signal, and acquires the first identification information using the fifth array-processed signal and the sixth array-processed signal.

29. The adaptive array processing device, according to claim 28, wherein the fifth array processing section and the sixth array processing section are characterized in that a gain with respect to the target signal is non-zero.

30. The adaptive array processing device, according to claim 28, wherein the first identification information generation section generates the control signal using correlation between the fifth array-processed signal and the sixth array-processed signal.

31. The adaptive array processing device, according to claim 28, wherein
the first identification information generation section filters the fifth array-processed signal and the sixth array-processed signal to thereby acquire a fifth filter-processed signal and a sixth filter-processed signal, and acquires the first identification information using the fifth filter-processed signal and the sixth filter-processed signal.

32. The adaptive array control device, according to claim 28, wherein
the fifth array processing section and the sixth array processing section perform array-processing on signals acquired from a plurality of pairs of sensors having different sensor intervals, among the plurality of sensors arranged in an array, to thereby acquire a fifth array-processed signal and a sixth array-processed signal.

33. An adaptive array processing device comprising:
sixth array processing means for enhancing a target signal with respect to other signals to thereby acquire a sixth array-processed signal;
seventh array processing means for attenuating the target signal with respect to other signals to thereby acquire a seventh array-processed signal;
correlation elimination means for eliminating a signal component correlated to the seventh array-processed signal from the sixth array-processed signal and outputting the sixth array-processed signal;
first identification information generation means for applying first array processing to signals acquired in a plurality of sensors arranged in an array and calculating a relative ratio between the target signal and interference based on phase information to thereby acquire first identification information;
correction signal generation means for generating a correction signal, using the first identification information, for performing larger correction when target signal power is higher than interference power;
second identification information generation means for calculating a relative ratio between the target signal and the interference based on amplitude information to thereby acquire second identification information;
correction means for correcting the second identification information according to the correction signal to thereby acquire corrected identification information; and
control means for controlling speed and accuracy of parameter adjustment in adaptive array processing using the corrected identification information.

34. An adaptive array processing method comprising:
enhancing a target signal with respect to other signals to thereby acquire a sixth array-processed signal;
attenuating the target signal with respect to other signals to thereby acquire a seventh array-processed signal;
when eliminating a signal component correlated to the seventh array-processed signal from the sixth array-processed signal and outputting the sixth array-processed signal, applying first array processing to signals acquired in a plurality of sensors arranged in an array and calculating a relative ratio between the target signal and interference based on phase information to thereby acquire first identification information;
generating a correction signal, using the first identification information, for performing larger correction when target signal power is higher than interference power;
calculating a relative ratio between the target signal and the interference based on amplitude information to thereby acquire second identification information;
correcting the second identification information according to the correction signal to thereby acquire corrected identification information; and
controlling speed and accuracy of parameter adjustment in adaptive array processing using the corrected identification information.

35. The adaptive array processing method, according to claim 34, wherein
the second identification information is acquired by applying second array processing to signals acquired in a plurality of sensors arranged in an array and calculating the relative ratio between the target signal and the interference based on the amplitude information.

36. The adaptive array processing method, according to claim 34, wherein
the second array processing includes attenuating the target signal with respect to other signals to thereby acquire a third array-processed signal, and enhancing the target signal with respect to other signals to thereby acquire a fourth array-processed signal, and acquiring the second identification information based on the third array-processed signal and the fourth array-processed signal.

37. The adaptive array processing method, according to claim 36, wherein
the second array processing includes performing array processing on signals acquired from a plurality of pairs of sensors having different sensor intervals, among a plurality of sensors arranged in an array, to thereby attenuate the target signal with respect to other signals and acquire a third array-processed signal.

38. The adaptive array processing method, according to claim 36, wherein
the second array processing includes analyzing the fourth array-processed signal to thereby acquire a signal characteristic, and correcting the fourth array-processed signal according to the signal characteristic to thereby acquire a corrected array-processed signal, and acquiring the second identification information based on the corrected array-processed signal and the fourth array-processed signal.

39. The adaptive array processing method, according to any one of claims 34, wherein the first array processing includes performing fifth array processing and sixth array processing in which input signals are equal and a phase difference between output signals is zero with respect to a signal incoming from a direction vertical to the array, and with respect to a signal incoming from another direction, the phase difference takes a value between zero and 180 degrees corresponding to the direction, to thereby acquire a fifth array-processed signal and a sixth array-processed signal, and acquiring the first identification information using the fifth array-processed signal and the sixth array-processed signal.

40. The adaptive array processing method, according to claim 39, wherein the fifth array processing and the sixth array processing are characterized in that a gain with respect to the target signal is non-zero.

41. The adaptive array processing method, according to claim 39, wherein the first array processing includes generating the control signal using correlation between the fifth array-processed signal and the sixth array-processed signal.

42. The adaptive array processing method, according to claim 39, wherein the first array processing includes filtering the fifth array-processed signal and the sixth array-processed signal to thereby acquire a fifth filter-processed signal and a sixth filter-processed signal, and acquiring the first identification information using the fifth filter-processed signal and the sixth filter-processed signal.

43. The adaptive array processing method, according to claim 39, wherein the fifth array processing and the sixth array processing include performing array-processing on signals acquired from a plurality of pairs of sensors having different sensor intervals, among the plurality of sensors arranged in an array, to thereby acquire a fifth array-processed signal and a sixth array-processed signal.

44. A computer readable medium storing an adaptive array controlling program causing a computer to perform functions of:

enhancing a target signal with respect to other signals to thereby acquire a sixth array-processed signal;

attenuating the target signal with respect to other signals to thereby acquire a seventh array-processed signal;

eliminating a signal component correlated to the seventh array-processed signal from the sixth array-processed signal and outputting the sixth array-processed signal;

applying first array processing to signals acquired in a plurality of sensors arranged in an array and calculating a relative ratio between the target signal and interference based on phase information to thereby acquire first identification information;

generating a correction signal, using the first identification information, for performing larger correction when target signal power is higher than interference power;

calculating a relative ratio between the target signal and the interference based on amplitude information to thereby acquire second identification information;

correcting the second identification information according to the correction signal to thereby acquire corrected identification information; and controlling speed and accuracy of parameter adjustment in adaptive array processing using the corrected identification information.

* * * * *

UNITED STATES PATENT AND TRADEMARK OFFICE
CERTIFICATE OF CORRECTION

PATENT NO. : 7,944,775 B2
APPLICATION NO. : 12/297853
DATED : May 17, 2011
INVENTOR(S) : Akihiko Sugiyama It is certified that error appears in the above-identified patent and that said Letters Patent is hereby corrected as shown below:

In the Claims

Column 32, Line 39: In Claim 35, delete "claim 34," and insert -- claim 33, --

Signed and Sealed this
Fourth Day of March, 2014

Michelle K. Lee
*Deputy Director of the United States Patent and Trademark Office*